US011709895B2

(12) United States Patent
Singh et al.

(10) Patent No.: US 11,709,895 B2
(45) Date of Patent: *Jul. 25, 2023

(54) HYBRID APPROACH TO APPROXIMATE STRING MATCHING USING MACHINE LEARNING

(71) Applicant: Visa International Service Association, San Francisco, CA (US)

(72) Inventors: Pranjal Singh, Uttar Pradesh (IN); Soumyajyoti Banerjee, West Bengal (IN)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/514,677

(22) Filed: Oct. 29, 2021

(65) Prior Publication Data

US 2022/0050879 A1    Feb. 17, 2022

Related U.S. Application Data

(63) Continuation of application No. 15/493,833, filed on Apr. 21, 2017, now Pat. No. 11,194,865.

(51) Int. Cl.
*G06N 20/00* (2019.01)
*G06F 16/33* (2019.01)
(Continued)

(52) U.S. Cl.
CPC .... *G06F 16/90344* (2019.01); *G06F 16/3329* (2019.01); *G06F 16/3331* (2019.01);
(Continued)

(58) Field of Classification Search
CPC .......... G06F 16/90344; G06F 16/3329; G06F 16/3331; G06F 40/274; G06F 40/284;
(Continued)

(56) References Cited

U.S. PATENT DOCUMENTS 6,269,335 B1    7/2001   Ittycheriah et al.
8,015,183 B2    9/2011   Frank
(Continued)

FOREIGN PATENT DOCUMENTS

| KR | 101126406 | 4/2012 |
|---|---|---|
| KR | 20130020418 | 2/2013 |
| WO | 2016032866 | 3/2016 |

OTHER PUBLICATIONS

Mikhail Bilenko, Adaptive Duplicate Detection Using Learnable String Similarity Measures, SIGKDD '03, Aug. 2427, 2003, Washington, DC, USA (Year: 2003) (Year: 2003).*
(Continued)

*Primary Examiner* — Ying Yu Chen
*Assistant Examiner* — Su-Ting Chuang
(74) *Attorney, Agent, or Firm* — Kilpatrick Townsend & Stockton LLP

(57) ABSTRACT

Systems, apparatuses, and methods are provided for identifying a corresponding string stored in memory based on an incomplete input string. A system can analyze and produce phonetic and distance metrics for a plurality of strings stored in memory by comparing the plurality of strings to an incomplete input string. These similarity metrics can be used as the input to a machine learning model, which can quickly and accurately provide a classification. This classification can be used to identify a string stored in memory that corresponds to the incomplete input string.

20 Claims, 18 Drawing Sheets

(51) Int. Cl.
  *G06F 16/332* (2019.01)
  *G06N 20/20* (2019.01)
  *G06N 20/10* (2019.01)
  *G06F 40/274* (2020.01)
  *G06F 40/284* (2020.01)
  *G06F 16/903* (2019.01)
  *G06N 5/01* (2023.01)

(52) U.S. Cl.
  CPC .......... *G06F 40/274* (2020.01); *G06F 40/284* (2020.01); *G06N 5/01* (2023.01); *G06N 20/00* (2019.01); *G06N 20/10* (2019.01); *G06N 20/20* (2019.01)

(58) Field of Classification Search
  CPC .... G06F 16/3343; G06N 5/003; G06N 20/00; G06N 20/10; G06N 20/20
  See application file for complete search history.

(56) References Cited

U.S. PATENT DOCUMENTS

| | | |
|---|---|---|
| 10,353,938 B1 | 7/2019 | Malpani et al. |
| 2005/0278378 A1 | 12/2005 | Frank |
| 2008/0104056 A1 | 5/2008 | Li et al. |
| 2008/0147637 A1 | 6/2008 | Li et al. |
| 2013/0117246 A1 | 5/2013 | Cabaniols et al. |
| 2014/0074886 A1 | 3/2014 | Medelyan et al. |
| 2015/0066474 A1 | 3/2015 | Yi et al. |
| 2015/0254327 A1 | 9/2015 | Patil |
| 2015/0278188 A1 | 10/2015 | Aras et al. |
| 2016/0314186 A1 | 10/2016 | Bremer et al. |
| 2017/0109668 A1 | 4/2017 | Marcu et al. |
| 2018/0137150 A1 | 5/2018 | Osesina et al. |

OTHER PUBLICATIONS

Bilenko et al., "Adaptive Duplicate Detection Using Learnable String Similarity Measures", Aug. 24, 2003, 10 pages.

Application No. EP18787710.5, Extended European Search Report, dated Apr. 9, 2020, 9 pages.

Hall et al., "Approximate String Matching", Association for Computing Machinery Computing Surveys, vol. 12, No. 4, Dec. 1980, pp. 381-402.

Martins et al., "A Supervised Machine Learning Approach for Duplicate Detection Over Gazetteer Records", International Conference on GeoSpatial Sematics, May 2011, pp. 34-51.

Application No. PCT/US2018/025096, International Search Report and Written Opinion, dated Jul. 18, 2018, 13 pages.

U.S. Appl. No. 15/493,833, Final Office Action, dated Apr. 28, 2021, 26 pages.

U.S. Appl. No. 15/493,833, Non-Final Office Action, dated Mar. 20, 2020, 15 pages.

U.S. Appl. No. 15/493,833, Non-Final Office Action, dated Oct. 15, 2020, 22 pages.

U.S. Appl. No. 15/493,833, Notice of Allowance, dated Jul. 28, 2021, 9 pages.

* cited by examiner

| Distance Metrics | Phonetic Metrics |
| --- | --- |
| Levenshtein Distance | Metaphone |
| Hamming Distance | Double Metaphone |
| Jaccard Distance | Soundex |
| Jaro Winkler Distance | NYSIIS |
| Levenshtein Small Alignment | Match Rating Codex |
| Levenshtein Long Alignment | Caverphone |
| Affine Gap | |

FIG. 5

HYBRID APPROACH TO APPROXIMATE STRING MATCHING USING MACHINE LEARNING

CROSS-REFERENCES TO RELATED APPLICATIONS

This application is a Continuation of U.S. patent application Ser. No. 15/493,833 filed on Apr. 21, 2017 entitled "Hybrid Approach To Approximate String Matching Using Machine Learning" the contents of which are incorporated by reference herein in their entirety for all purposes.

BACKGROUND

In recent years searching through databases has become an extremely ubiquitous part of business, government, and industrial operations. Outside of commercial search, most organizations maintain some sort of database which can be searched and accessed for information relevant to business operations, such as the names and phone numbers of employees and clients, sales records, and active projects.

These databases receive inputs in the form of queries, typically taking the form of a "string," or an ordered set of "characters." Commonly strings take the form of a name of a person or business. Databases rely on accurate entry of string queries. A database which is queried with an incorrect or incomplete string cannot produce the desired information.

Human error is a common cause of producing incorrect or incomplete strings. Over the course of thousands and thousands of keystrokes, a human typist will produce several incorrect or incomplete input strings. Likewise, digital transmission error, such as noise, interference or distortion can result in incorrect or incomplete strings.

These errors often result in cost or loss to businesses which rely on searching databases using strings. The economic importance of searching combined with the common rate of errors has led to considerable interest in string matching; a process where an incorrect or incomplete input string is matched to a correct string, which is then used to query a database. String matching presents a way to reduce some of the cost to business introduced by incorrect or incomplete input strings.

Most methods to match a corresponding string to an incomplete or incorrect are "rule-based." They involve creating a computer program which alters a string based on rules of grammar, spelling, and occasionally probability. An example of such a rule is "I before E except after C," a common heuristic for spelling English language words. However, language and string construction in general is typically very complicated. English words such as "science" are clear exceptions to the above rule. Likewise, names have no such requirement. In order to produce even adequate results rule-based methods need to incorporate hundreds of rules and exceptions. As a result rule-based methods are costly to produce and implement.

There is a need for a new and efficient technique for identifying a corresponding string based on an incomplete or incorrect input string.

BRIEF SUMMARY

Embodiments of the invention provide methods, apparatuses, and systems for implementing approximate string matching using machine learning. For example, input data can take the form of an incomplete input string, which may be entered as a search query. The incomplete input string can be used to determine which stored string (e.g., from among a plurality of stored strings, as may occur in a database) corresponds to the incomplete input string. For each stored string, the input string can be compared to the stored string to produce a plurality of similarity metrics, including at least one phonetic metric and at least one distance metric. The similarity metrics can serve as an input to a machine learning model to obtain a similarity score (e.g., a confidence rating) for the stored string. The similarity scores can then be used to classify whether the incomplete input string might correspond to any number of the plurality of strings stored in memory. The stored string with the highest similarity score can be output in a response. Other stored strings can also be output (e.g., ones with a similarity score above a threshold).

Embodiments of the invention provide for advantages over conventional methods because a string stored in memory can quickly and accurately be determined from an incomplete input string. These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 5 is a table of phonetic and distance metrics according to embodiments of the invention.

TERMS

Figure 1:
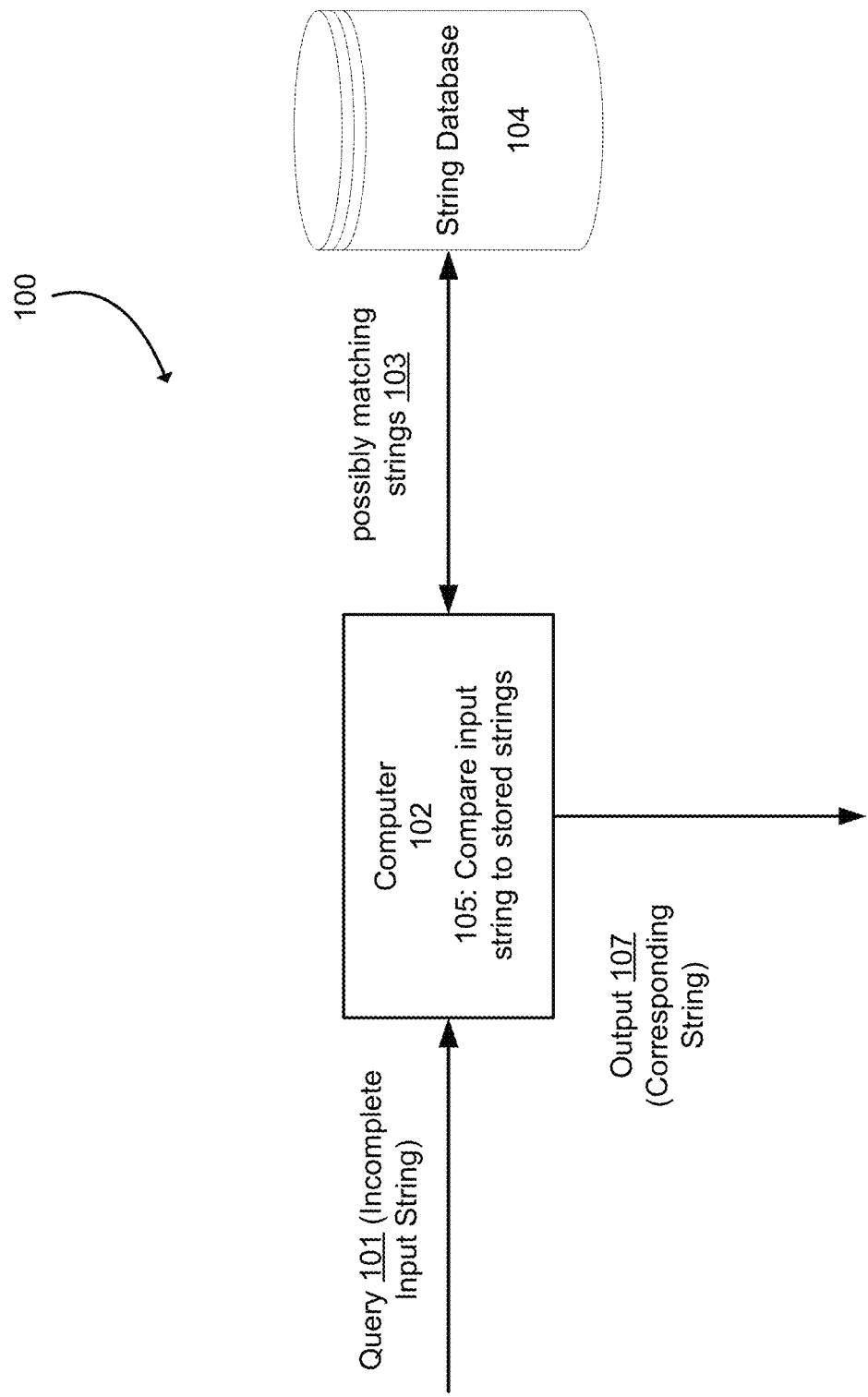
FIG. 1 is a diagram showing a simple system composed of a computer and string database capable of performing the method of matching an incomplete input string to a corresponding string stored in memory according to embodiments of the invention.

Prior to discussing embodiments of the invention, description of some terms may be helpful in understanding embodiments of the invention.

The term "machine learning model" may refer to a set of software routines and parameters that can predict an output of a process (e.g., identification of an attacker of a computer network, authentication of a computer, a suitable recommendation based on a user search query, etc.) based on a set of input features. A structure of the software routines (e.g., number of subroutines and relation between them) and/or the values of the parameters can be determined in a training process, which can use actual results of the process that is being modeled.

The term "training computer" may refer to any computer that is used in training the machine learning model. As examples, a training computer can be one of a set of client computers from which the input data is obtained, or a server computer that is separate from the client computers.

The term "string" may refer to an ordered set of "characters." A character is a sign or symbol, things which represent an idea, concept, relationship, or otherwise can be taken to mean something other than itself. Common characters are letters, such as "A," the first letter of the English alphabet and many other Latin derived alphabets, numerals include Arabic numerals such as "5," and pictographs such as hieroglyphs or wingdings. Even punctuation and the whitespace between letters qualify as a character. Thus strings include all words in any written language, all numbers, equations and all nonsense sequences, provided they are comprised of characters.

The term features may refer to aspects of a particular piece of data or observation. A point on a Cartesian plane has features x and y. An observed bird might have features of length of wingspan, color, and weight.

The term similarity metric may refer to a measurement of whether or not two strings are similar and in some cases, the degree to which the strings are similar. Similarity metrics can take the form of phonetic metrics or distance metrics.

The term phonetic metrics may refer to measures of whether or not two strings are homophones. A phonetic metric can take on the value of 1 if the strings are homophones or 0 if the strings are not. Phonetic metrics rely on phonetic algorithms.

The term phonetic algorithm may refer to a method of encoding a string as a different string in a way that preserves some phonetic information. A phonetic algorithm can be used so that strings can be compared to determine if they are homophones. Examples of phonetic algorithms include Metaphone, Double Metaphone, Soundex, NYSIIS, Match Rating Codex, and Caverphone.

The term distance metrics may refer to measures of how similar one string is to another string based on the content of the two strings. Two strings that are similar have a short "distance" between them, and thus have a low distance metric.

The term database query may refer to a request for information from a database meeting some set of conditions.

The term filtration may refer to the process by which some elements from a set of elements are removed prior to performing a process, method, or subroutine on those elements. In doing so, the computer avoids wasting time by processing elements that are not important or relevant.

The term n-gram may refer to a contiguous substring of length n from a string. A 2-gram is called a bigram, and a 3-gram is called a trigram. The string "ABC" has two bigrams: "AB" and "BC."

The term tree may refer to a data structure composed of nodes and directed connections between nodes. The first node is the root node, a parent node which connects to a number of child nodes. Each child node may be the parent of further child nodes. A child node without any children is a leaf node. Trees are a common way of organizing computer data or computer operations. A forest is a collection of multiple, separate trees.

The term bagging may refer to a process by which the outputs of machine learning models are combined in order to produce a single output. Typically this takes the form of a weighted average of the outputs. In one example of a bagging scheme for a set of machine learning classifiers, the single output is the majority classification. Effectively the machine learning classifiers perform a majority vote to determine what classification to output.

DETAILED DESCRIPTION

String matching can be difficult to implement efficiently. The present disclosure provides for methods of identifying a corresponding string stored in memory based on an incomplete input string. These methods can enable computer systems to rapidly and accurately match strings without relying on currently used, cumbersome rule-based methods.

Embodiments can provide for the construction and use of similarity metrics, including phonetic and distance metrics. These similarity metrics can be used as inputs to a machine learning model. The machine learning model can be trained and used to provide a similarity score for any number of strings stored in memory relative to a possibly incomplete input string. The training of the model can use iterative techniques that optimize the predicted result based on a set of training data for which the result is known. The similarity scores can be used to identify a corresponding string stored in memory. Some embodiments allow for the use of bigrams in comparing incomplete input strings and strings stored in memory as part of an initial filtering process.

An overview is provided below, followed by in-depth description of techniques. Results show an increase in accuracy over conventional methods of incomplete string identification. In a trial of approximately 1000 experimental incomplete strings generated from real credit card transaction data, a string matching system according to embodiments accurately identified experimental strings 96.12% of the time. These results show an increase in accuracy over conventional methods.

I. Overview of Querying Using an Incomplete String

A. Matching Search Query Including an Incomplete String

FIG. 1 displays a block diagram of a system 100 capable of performing methods according to embodiments of the invention. System 100 can receive an input of an incomplete string and can identify a string stored in a database that most likely matches the incomplete string.

A query, 101, comprising an incomplete input string is sent, input, or provided to a computer 102. This query can take the form of plaintext, encoded text, such as UTF-8, or any machine readable string format. In some embodiments, the query can also include location information, such as city, state, postal code and country. This location information can similarly be stored in any machine-readable format. The location information can be used to identify only strings relevant to a particular location.

The computer 102 receives the query. This computer can either take the form of a single computer with a single processor, a single computer with multiple processors, or a distributed computing network comprising multiple computers each with one or more processors. The computer comprises at least a processor, network interface, and computer readable medium containing code.

The computer 102 establishes communication with a string database 104 using the computer's network interface, in order to retrieve possible matching strings. This communication comprises querying the database to retrieve strings stored in memory 103. According to embodiments of the invention, communication can be accomplished either via a wired or wireless connection. This communication can be mediated using any common computer communication protocols, such as TCP or UDP in the case of an internet connection, IEEE 802.11 in the case of a WLAN communication, USB or other wired connection protocols in the case of a directly wired connection.

The possible matching strings 103 can take the form of any number of strings retrieved from the database 104 along with any data associated with those strings in the database. Such associated data can include location data, phonetic information, or other bigrams.

The string database 104 is any memory element capable of storing and indexing string such that the method according to embodiments of the invention can be accomplished. It can take the form of any organized collection of strings and associated data on a computer readable medium such as RAM, ROM, or magnetic hard disk.

The computer 102 is capable of comparing the incomplete input string 101 to the possibly matching strings 103 using the method according to embodiments of the invention 105. This method can be stored on the computer readable medium as code or logic and executed by the computers processor, or completed using specialized hardware.

The computer is capable of producing an output 107, which can be a single string or other computer or human readable data structure comprising a string or series of strings and can include additional information associated with the strings, such as location data, phonetic information, substring or bigrams. This output corresponds to at least one of the strings retrieved from the string database 104, and according to embodiments of the invention, comprises the corresponding string stored in memory.

B. Overview of Example Method

Figure 2:
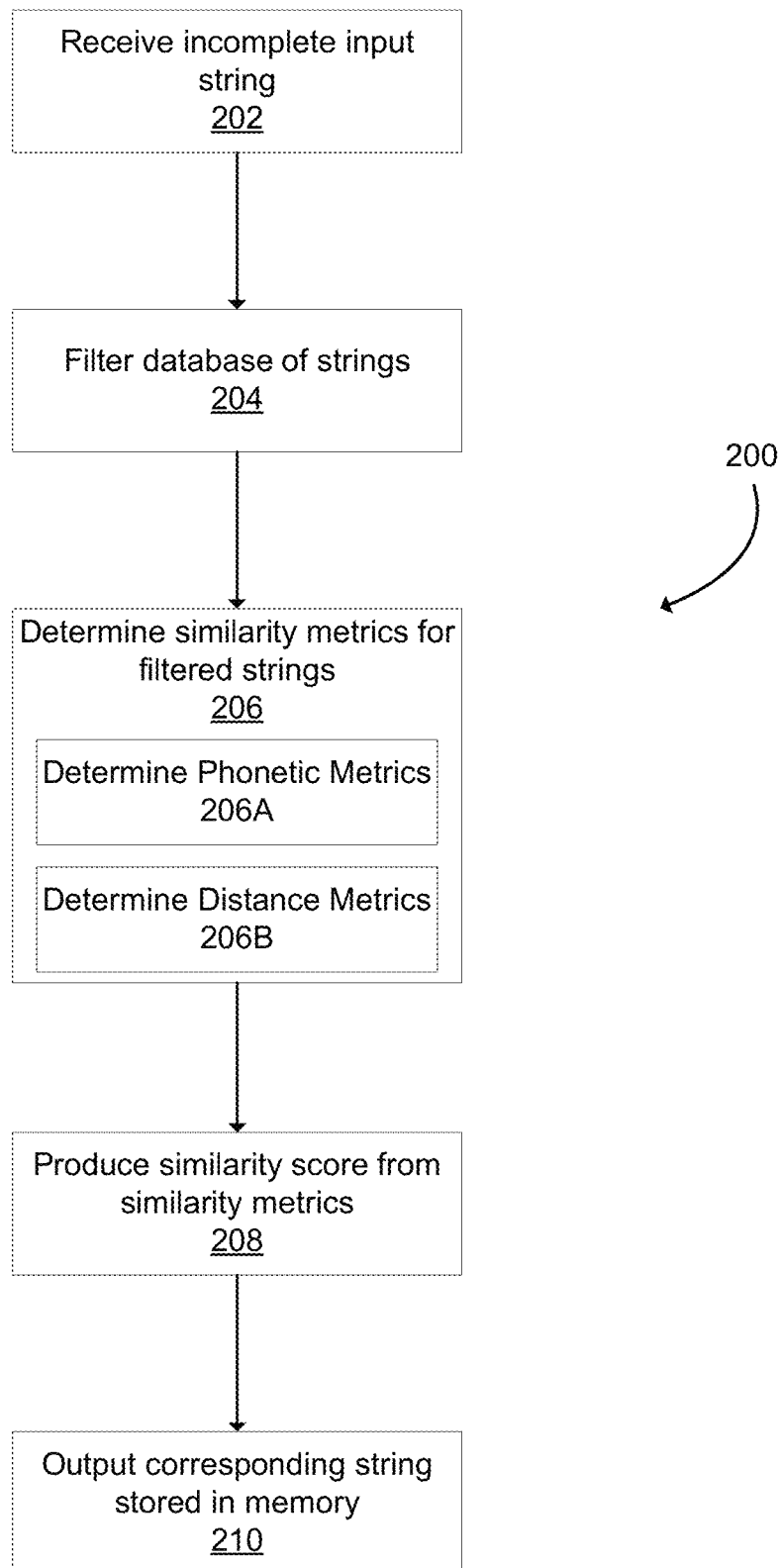
FIG. 2 is a diagram showing a high level overview of the method for determining a corresponding string stored in memory based on an incomplete input string according to embodiments of the invention.

FIG. 2 displays an overview of a method 200 of identifying a corresponding string stored in memory based on an incomplete input string according to some embodiments of the invention.

Step 202 can involve the computer system receiving the incomplete input string. The string can be received over a wired or wireless connection using the computer's network interface, or via an interface such as a keyboard.

In step 204, the computer can request and filter strings from a database or other data structure containing strings and associated information. This can involve communicating with the string database in order to receive a plurality of strings from the strings stored in the database. The strings can be filtered using a variety of filtration methods. One such method could involve comparing location information associated with the input string and the stored strings, and filtering out stored strings for which the location information does not match. Another filtration method could involve comparing the characters in the input string and the stored strings, then filtering strings that do not meet a certain character matching or bigram matching threshold. In the present disclosure, the term "filtered strings" will refer to strings stored in memory that were not filtered out.

Step 206 can involve the computer comparing the incomplete input string to the filtered strings in order to produce a variety of similarity metrics. Similarity metrics are measurements of the similarity between two strings, and can take the form of phonetic metrics (produced in step 206A) or distance metrics (produced in step 206B). Examples of phonetic and distance metrics are articulated above in the Terms section.

Calculating these metrics can involve numerous methods of comparison between two strings, accomplished either by a processor with the aid of code or logic stored on a computer readable medium or by special purpose hardware or electro-mechanical devices. Such comparisons can be accomplished with piecewise comparisons of characters or other sub strings of any length, iteratively or recursively.

At step 208, the computer can utilize these similarity metrics to produce a similarity score. According to embodiments of the invention, this similarity score can be produced using a machine learning model capable of classifying inputs based on their features. Such a model can take the form of a support vector machine, random forest, or logistic regression among other such appropriate classifier models. The machine learning models can be stored as code on a computer readable medium and interpreted by the processor, or take the form of specialized hardware.

At step 210, the computer can output the corresponding string stored in memory based on the incomplete input string. According to embodiments of the invention, the computer is able to do so by evaluating the similarity scores produced for one or more strings stored in memory in order to determine the string associated with the greatest similarity score. This can be accomplished with code stored on a computer readable medium which is interpretable by the processor, or via hardware, such as a simple comparator circuit.

Figure 3:
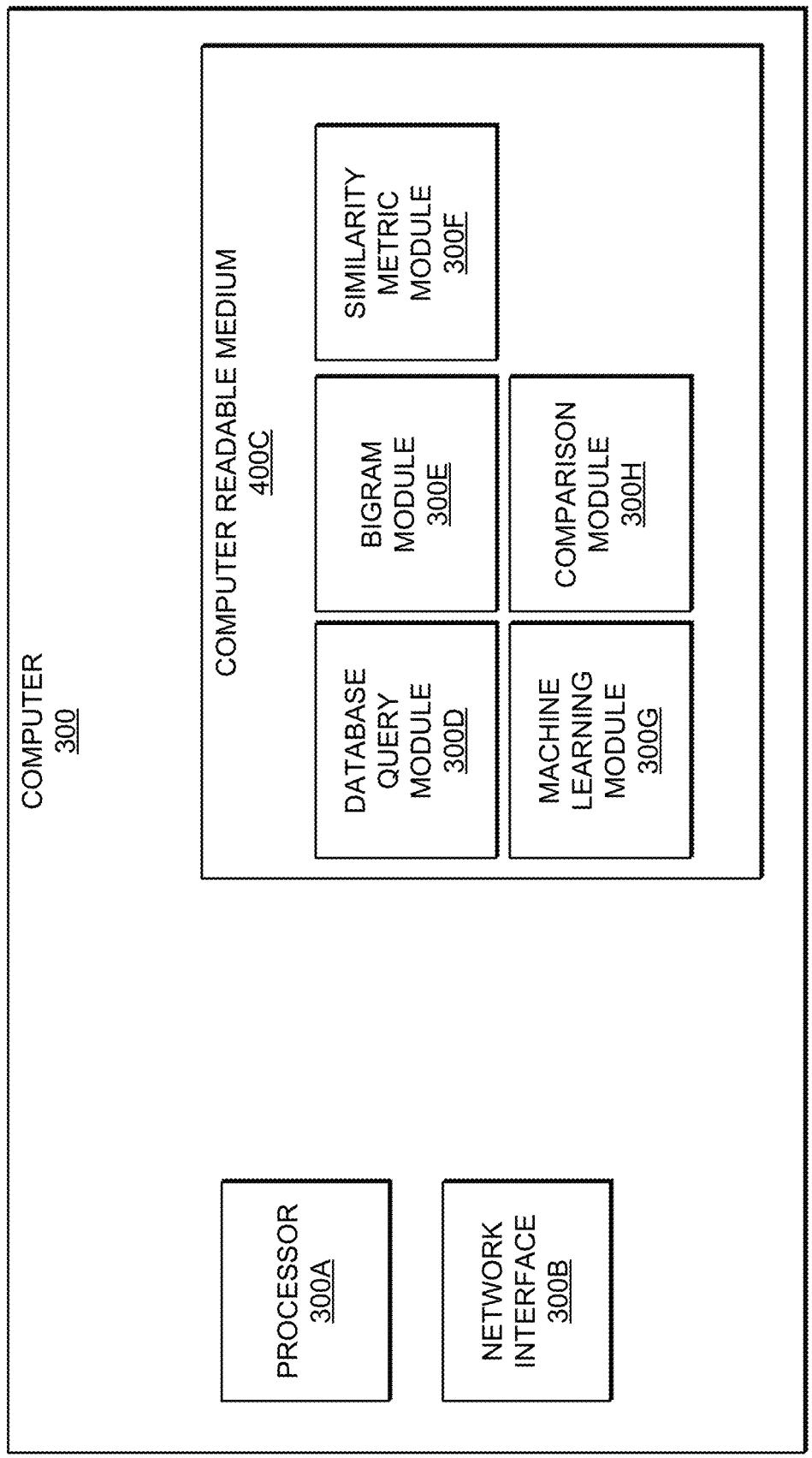
FIG. 3 is a diagram showing a computer and associated components, computer readable medium and modules which can perform the method of FIG. 2 according to embodiments of the invention.

C. Example Components and Modules in Computer for Finding Best Match for Input String FIG. 3 displays a block diagram of a computer 300 and associated hardware, computer readable medium, and modules which can be used to perform the method of identifying a corresponding string stored in memory based on an incomplete input string according to embodiments of the invention. Computer 300 can correspond to computer 102 of FIG. 1.

The computer 300, can possess a processor 300A, and a network interface 300B. The network interface enables the computer to communicate with the database or other computers in a computer cluster. Further, the computer possesses a computer readable medium 300C, comprised of five modules.

The processor 300A can be one or more sets of general purpose hardware, circuitry and computer readable memory which can carry out the instructions of a computer program, including performing arbitrary sequences of basic arithmetic, logical, control or input/output functions as specified by the instruction. The processor can be contained on a single integrated circuit or can exist in the form of a virtual processor contained on the computer readable medium. In some cases, the processor could be a "multi-core" processor, in which case multiple sets of general purpose hardware can work in tandem to carry out the instructions of a computer program.

The network interface 300B can be a set of hardware capable of sending, receiving, and interpreting communications from other computers or hardware on the network. Such an interface can communicate via a wired or wireless connection.

The computer readable medium 300C can be any physical structure capable of storing and providing computer programs, instructions, logic, or computer interpretable data. Examples of such a structure include magnetic hard drives, RAM, and ROM among others. The computer readable medium can be composed of any appropriate material, such as semiconductor material like silicon or gallium-arsenide, magnetic material, or any other material that can have its state interpreted as computer programs, instructions, logic, or computer readable data.

In the example shown, five modules 300D-H are stored on the computer readable medium 300C. Each module could comprise code to enact part of a method of matching a corresponding string in memory based on an incomplete input string. In some cases, the modules could be special purpose hardware or circuitry.

The database query module 300D can to accept a search query over the network interface and communicate with the database, which may be stored locally or elsewhere on the network. Additionally, the database query module can enable the processor to query the database and receive the requested strings stored in the database.

The database query module can for example, send a message to the database stating that it wishes to establish further communication. The database can respond with a request for credentials which authorize the module to retrieve data from the database. The module can provide those credentials, at which point the database communicates that it will give the module access to the data. The module can then compose and send a query, detailing the characteristics of the strings the module needs. The database can receive and interpret this query, then perform a search to determine which strings and associated data meets the module's needs. The database can further send this data serially or in parallel over the wired or wireless medium back to the module, which can then send a message terminating communication with the database.

Querying a database can be accomplished in numerous ways, depending on the type of database and the underlying software or standard. A relational database, for example, consists of one or more tables each comprising "records" or "rows" and "fields" or "columns." In a relational database, tables can be associated via a relationship or link. The association of different tables is what enables a database to efficiently retrieve data.

In Structured Query Language (SQL), a database can be queried using a 'select' statement. "SELECT String, Bigrams FROM AllStrings WHERE Location='India'" is an example of a select statement. This statement asks the database to look through the table "AllStrings" and return records from the fields of "String" and "Bigrams," but only for records where the "Location" field is India. This presents a simple way of retrieving strings and bigrams from a database that are associated with India.

The bigram module 300E can extract the input string from the search query and produce a set of bigrams from the extracted input string. Further, the bigram module can compare the bigrams produced from the search query to predetermined bigrams associated with the stored strings retrieved from the database in order to filter the retrieved database strings.

The similarity metric module 300F can take the filtered strings produced by the bigram module (when the bigram module is used) and produce a variety of similarity metrics, comprising both phonetic and distance metrics. The similarity metric module 300F can determine a set of similarity metrics between the input string and each of the retrieved strings (e.g., possibly matching strings 103 of FIG. 1). Thus, multiple similarity metrics can be determined for each retrieved string.

The machine learning module 300G can contain code that defines a machine learning model, as well as code that can enable the processor to train the machine learning model. The trained machine learning model can accept feature inputs in the form of similarity metrics and produce a similarity score for each retrieved string.

The comparison module 300H can contain code that enables the processor to compare the similarity scores and produce one or more retrieved strings from the database corresponding to the incomplete input string. The strings with the highest similarity scores (e.g., top 10 or other number) can be provided.

II. Bigrams

As explained above, bigrams are a set of two contiguous characters from a string. As an example, the string "ABC" has two bigrams, "AB," and "BC." Embodiments can use a bigram module 300E to extract a first set of bigrams from the input string and a second set of bigrams from one of the strings stored in memory. The sets of bigrams can be compared to produce a bigram matching coefficient. This bigram matching coefficient can be compared to a predetermined threshold value, and if the bigram matching coefficient is less than the threshold value, the string stored in memory can be "filtered out." In this manner, strings that are very different from the input string can be removed from further processing, thereby making the process more efficient.

Two non-empty sets of bigrams A and B can be compared using the following formula:

$$f(A, B) = \frac{|A \cap B|}{|A|} \quad (1a)$$

Formula 1a states that the bigram matching coefficient f is equal to the number of bigrams in the intersection of A and B divided by the number of bigrams in the set A. f can take on a value between 0 and 1, where 0 indicates that there is no overlap in bigrams between the two sets, and 1 indicates that set A is a subset of B.

A value of f can be calculated for each of a plurality of strings stored in memory, such that:

$$f_i(A_{input}, B_i) = \frac{|A_{input} \cap B_i|}{|A_{input}|} \quad (1b)$$

where $A_{input}$ is the set of bigrams determined from the input string, $B_i$ is the set of bigrams corresponding to the $i^{th}$ string stored in memory, and $f_i$ is the bigram matching coefficient corresponding to the $i^{th}$ string stored in memory.

Embodiments can provide for a threshold value t, with which to compare $f_i$. This threshold value can be used to filter out some of the strings stored in memory. If $f_i \leq t$, then the $i^{th}$ string stored in memory does not correspond to the input string. As such, the $i^{th}$ string stored in memory is filtered out and removed from further processing. If $f_i > t$, the $i^{th}$ string stored in memory is kept for future processing, and is referred as a filtered string.

Figure 4:
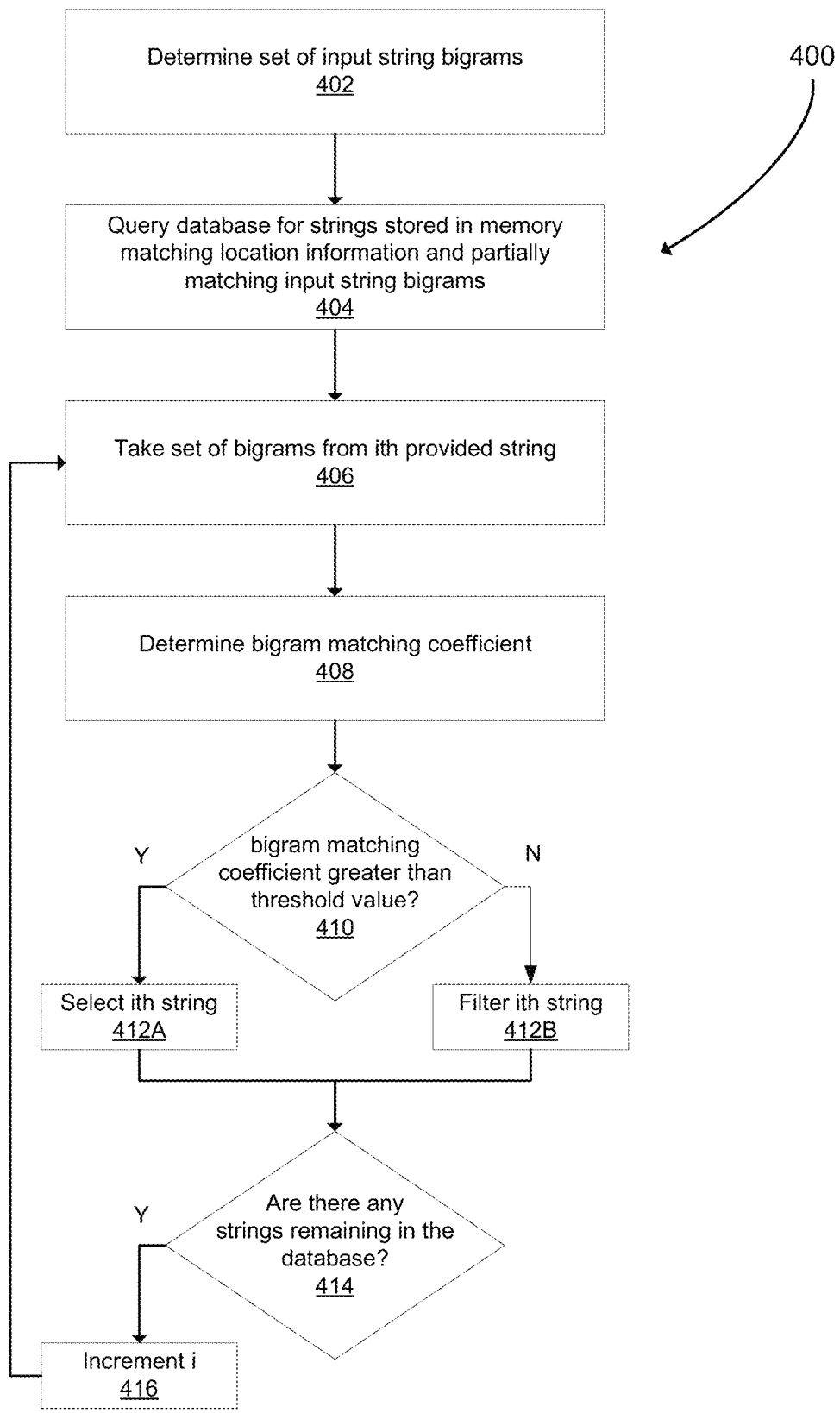
FIG. 4 is a diagram showing a process by which strings stored in memory can be filtered according to a set of rules according to embodiments of the invention.

FIG. 4 demonstrates a method 400 for filtering strings stored in memory according to one embodiment of the invention. Method 400 can be used to perform block 204 of FIG. 2. Method 400 can be performed by processor 300A of FIG. 3, and may use bigram module 300E.

At step 402, the processor can determine the set of bigrams corresponding to the input string. Bigrams can be determined from a string by iterating through a string, recording each character and the character that follows it, and storing each group of two contiguous characters as a bigram until the final character has been recorded.

At step 404, the processor can query the database or otherwise request strings stored in memory. The request can specify strings that have matching location information and partially or completely matching bigram information. A string can be stored with an associated location (e.g., in a string record that includes fields associated with the string), as well as a set of bigrams. Matching location information therefore refers to a case where the location information of the query matches the location information associated with a string. Partially or completely matching bigram information refers to a case where at least one bigram is present in both the incomplete input string and a stored string. In this way, the database or memory can provide strings stored in memory that both match the location given with the incomplete input string and are associated with at least one bigram (or at least some other specified number) present in the incomplete input string.

In the case of a relational or SQL-like database, the association between strings, location, and bigrams could be in the form of a table, where each row corresponds to a distinct string, and the columns are the string, its associated location, and its bigrams respectively:

| Row Number | String | Location | Bigrams |
|---|---|---|---|
| 1 | "Starbucks" | Seattle, WA | {ST, TA, AR, RB, BU, UC, CK, KS} |
| 2 | "Lowes" | Wilkesboro, NC | {LO, OW, WE, ES} |
| 3 | "Apple" | Cupertino, CA | {AP, PP, PL, LE} |

To elaborate further, querying the database involves sending a request to the database for some information which meets certain conditions. For example, consider the incomplete input string "COFFE" with associated location information "New York." The processor, having determined the bigrams of "COFFE" {CO, OF, FF, FE} in step 402, now can use the information to query the database. In a relational or SQL-like database, the query could look like this: "SELECT String, Bigrams, FROM AllStrings WHERE Location='New York' AND (Bigrams='CO' OR Bigrams='OF' OR Bigrams='FF' OR Bigrams='FE')." In this query, the processor is requesting that the database select certain strings from a database table entitled "All Strings." Each returned string should have "New York" in its associated location field, and should have at least one of the bigrams match one of the four bigrams (CO, OF, FF, FE) present in the incomplete input string.

At step 406, the processor can evaluate the bigrams corresponding to a first provided string. This can involve a process similar to step 402, where the processor uses some internally stored logic or code to determine the bigrams. In some embodiments, the bigrams corresponding to the first provided string have already been determined and are stored in the database along with the string itself. These bigrams could have been determined by the processor at an earlier time or determined by another computer or processor. In a relational database, these bigrams can be retrieved using a select statement.

At step 408, the processor determines a bigram matching coefficient (e.g., using formula 1b). The processor can iteratively compare each bigram from the input string to the bigrams corresponding to the first string stored in memory. As the processor iterates through the two sets of bigrams, it can maintain a count of the number of bigrams in the input string and the total number of bigrams shared between the two sets. The processor can then divide these two counts to produce the bigram matching coefficient.

At step 410, the processor compares the bigram matching coefficient to the threshold value. If the bigram matching coefficient is greater than the threshold value, the processor then proceeds to step 412A. If not, the processor proceeds to step 412B. This can be implemented using any software or hardware that allows for conditional logic, such as most programming languages and special purpose circuitry that allows for Boolean functions, such as arrays of transistors or gates.

At step 412A, the processor selects the first provided string for later comparison. This can involve copying the string to a new block of memory which will contain all the strings selected for later comparison.

At step 412B, the processor filters out the first provided string. Filtering out a string can involve not selecting the first provided string for later comparison.

At step 414, the processor checks to see if there are any remaining provided strings. If there are remaining provided strings, the computer proceeds to step 416A. Checking if there are any remaining provided strings can be accomplished in numerous ways. One example is counting the total number of strings at the beginning of the process. As the processor evaluates each string, it increases an internal counter. When the value of the internal counter equals the total number of strings, the processor determines that there are no more strings remaining.

At step 416 the computer increments its counter and returns to step 406. Many programming language allow for control flow statements, such as while loops, jump or "goto" statements, which can be used to move from one step of a program or instruction set to another.

This time at step 406, the computer requests the predetermined bigrams corresponding to a second string provided string. The process repeats from step 406 until the computer has compared the input string bigrams to all bigrams corresponding to provided strings. In this way, the strings selected by the system at step 414A are the filtered strings used in further processes.

III. Similarity Metrics

Embodiments of the invention provide for methods and systems that can produce similarity metrics, including phonetic and distance metrics from the incomplete input string and filtered strings. Similarity metrics are used as inputs to the machine learning model. Some embodiments of the invention make use of the similarity metric module 400F in order to produce the similarity metrics.

FIG. 5 shows a table of 13 example similarity metrics, 7 distance metrics (Levenshtein, Hamming, Jaccard, Jaro-Winkler, Levenshtein Small Alignment, Levenshtein Long Alignment, and Affine Gap) and 6 phonetic metrics (Metaphone, Double Metaphone Soundex, NYSIIS, and Match Rating Codex) which can be used as similarity metrics in some embodiments of the invention.

A. Phonetic Metrics

Phonetic metrics are produced by applying a phonetic algorithm to a string. This phonetic algorithm converts the string into another string that contains similar phonetic information:

$$S_b = P(S_a) \quad (2)$$

Where P is the phonetic algorithm, $S_a$ is an input string and $S_b$ is an output string that represents the phonetic information of $S_a$. As an example, using the American Soundex phonetic algorithm on the string "Robert" produces the string "R163."

A phonetic metric $M_i$ corresponding to a phonetic algorithm $P_i$ is defined as such:

$$M_i \stackrel{def}{=} \begin{cases} 0, & P_i(S_1) \neq P_i(S_2) \\ 1, & P_i(S_1) = P_i(S_2) \end{cases} \quad (3)$$

The phonetic metric takes on a value of 1 when the phonetic representations of two strings $S_1$ and $S_2$ are identical and takes on a value of 0 otherwise.

In some embodiments, for each of the filtered strings and for each of the phonetic metrics, the computer applies that phonetic metric to both the incomplete input string and the filtered string, and then determines whether or not the output strings for each are equivalent. If the output strings are equivalent, then a phonetic metric corresponding to a particular filtered string and a particular phonetic algorithm is equal to 1; otherwise, the phonetic metric corresponding to the particular filtered string and particular phonetic algorithm is equal to 0. In this way the computer produces one or more sets of one or more phonetic metrics, each set corresponding to one of the filtered strings.

Figure 6:
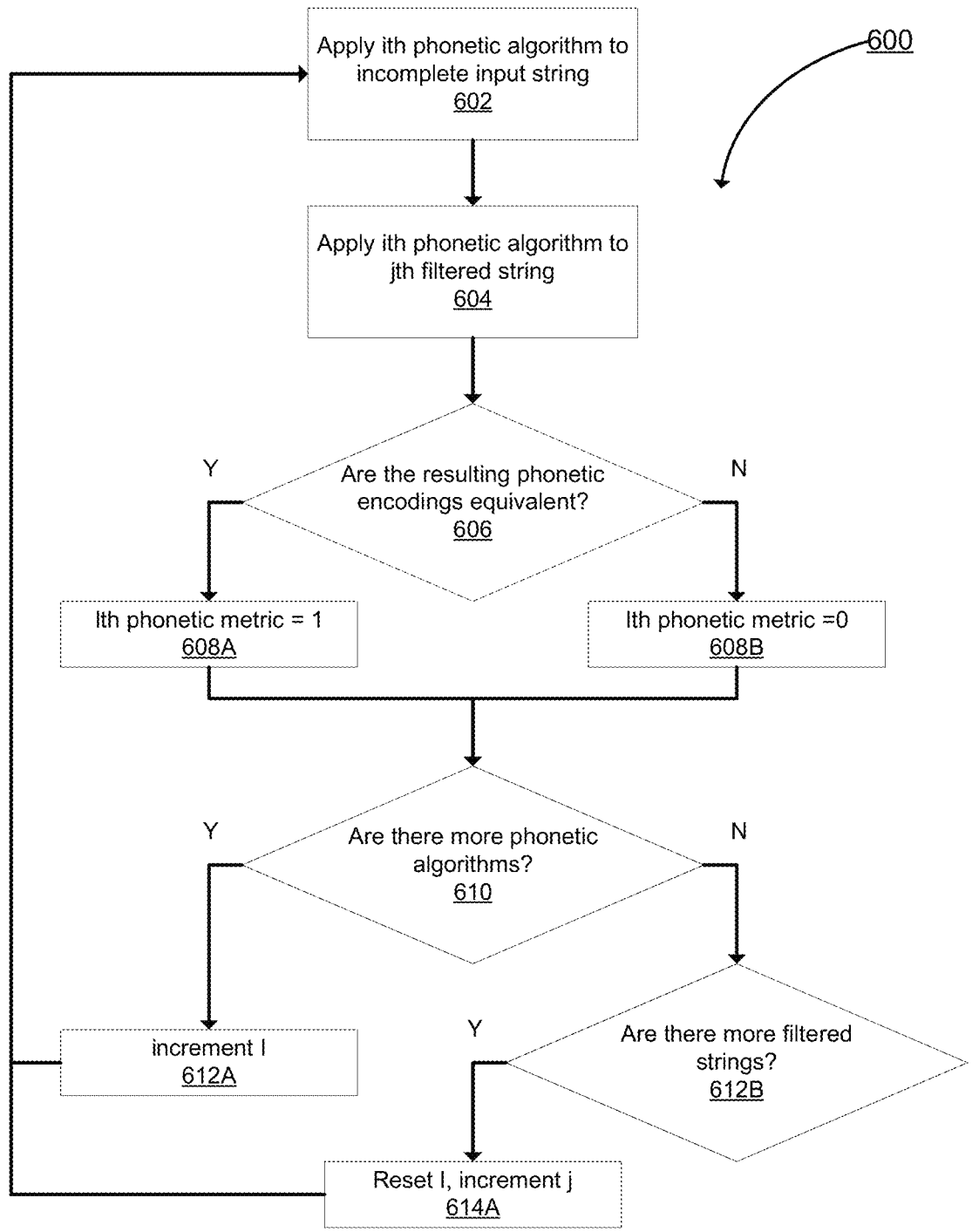
FIG. 6 is a diagram showing a process by which phonetic metrics can be calculated according to embodiments of the invention.

FIG. 6 displays a process 600 to produce similarity metrics corresponding to filtered strings according to embodiments of the invention. Process 600 can be used to perform block 206A of FIG. 2. Process 600 can be performed by processor 300A of FIG. 3, and may use similarity metric module 300F.

At step 602, the computer applies the first phonetic algorithm to the incomplete input string, producing a resulting phonetic encoding. Each phonetic algorithm can be stored on a computer readable medium as its own function or set of instructions. In C-like languages, a function can be written that accepts an input string and using the rules of the algorithm outputs another string according to those rules, using a variety of pointers, conditional statements, basic arithmetic and logic functions, along with allocations and deallocations of memory. A helper function could make use of function pointers, which indicate the address of a function in memory rather than a variable. Using the function pointer, the code could direct a processor to perform the function located at the address pointed to by the pointer with the incomplete input string as the argument. Numerous other methods in numerous other languages or hardware implementations could be used.

At step 604, the computer then applies the first phonetic algorithm to the first filtered string to produce a second resulting phonetic encoding. This can be accomplished in a manner similar to step 602, where the code instead instructs the processor to perform the first phonetic algorithm function with the first filtered string as its argument.

At step 606, the computer compares the two phonetic encodings. If the two phonetic encodings are equal, the computer proceeds to step 608A, otherwise it proceeds to step 608B. Such a comparison can be accomplished by using two character pointers, each initialized to point at the first character in each of the phonetic encodings. If those characters are found to be equal via a conditional statement, the processor can advance the two pointers to the next respective addresses. If the characters are not equal, the function indicates to the processor to proceed to step 608B, otherwise it continues advancing the pointers and comparing the memory at the addresses until it reaches a terminating character at each pointer, at which point the processor can conclude that the phonetic encodings are identical and can proceed to step 608A.

At step 608A, the computer sets a first phonetic metric corresponding to the first stored string equal to 1. At step 608B, the computer sets the first phonetic metric corresponding to the first stored string equal to 0. Other values can be used besides 0 and 1 to indicate the two classifications.

At step 610, the computer verifies that there are more phonetic algorithms that have not yet been used to produce phonetic metrics for the current filtered string. If there are more phonetic algorithms, the computer proceeds to step 612A, otherwise it proceeds to step 612B. Like in previous iterative methods disclosed above, verifying if there are more phonetic algorithms involves evaluating either an address or data stored at that address using conditional logic. If the address is found to be outside a range of addresses allocated to storing phonetic algorithm functions or pointers to phonetic algorithm functions, or if the data stored at that address matches a known data sequence which corresponds to the end of a block of memory or to unallocated memory, the processor can be instructed to proceed to step 612B, otherwise it proceeds to step 612A.

At step 612A, the computer increments its phonetic algorithm counter and then returns to step 604. Incrementing the phonetic algorithm counter could involve advancing a pointer that points to the phonetic algorithm functions. As mentioned above, returning to a previous step in a process flow in a computerized system can be accomplished by the use of a "jump" or "goto" statement, which instructs a processor to return to a previous instruction within the code.

At step 604, this time the computer applies the second phonetic algorithm. Process flow continues until the computer has worked through each phonetic algorithm. Applying the second phonetic algorithm can involve advancing the function pointer which points to each function enacting a phonetic algorithm. The processor, in calling the function pointer to by the function pointer now applies the second phonetic algorithm instead of the first. As the process continues, the function pointer will continue advancing, applying each phonetic algorithm in sequence.

At step 612B, the computer determines whether or not there are any additional filtered strings to analyze. If the computer determines that there are additional filtered strings to analyze, process 600 proceeds to step 614A. Determining whether or not there are any additional filtered strings to analyze can involve many of the same computer science fundamentals articulated above, as well as a variety of other methods. Notably the address or memory at the address of a filtered string pointer can be compared using conditional logic to determine if it corresponds to a filtered string or another block of memory. If it corresponds to a filtered string, then it follows that there are more filtered strings to analyze and the computer can proceed to step 614A. If it does not, it follows that there are no more filtered strings to analyze.

At step 614A, the processor's phonetic algorithm counter can be reset and the processor can advances a filtered string counter, then returns to step 604. This can involve setting the value of the variable corresponding to the phonetic algorithm counter to zero, increasing the value of the filtered string pointer, then initiating a "jump" or "goto" in order to return to step 604.

At step 604, the computer now applies the first phonetic algorithm to the incomplete input string and a second filtered string. Process flow can continue until each phonetic algorithm has been applied to each filtered string and each has been compared to the phonetic algorithm applied to the incomplete input string. At this point, the computer has produced a phonetic metric equal to 1 or 0 for each filtered string. As articulated above, this process could involve applying a function corresponding to a phonetic algorithm that is pointed to by a function pointer to a filtered string which is pointed to by a filtered string pointer. Numerous other solutions exist which could implement this method either in hardware, software, or other electro-mechanical device.

B. Distance Metrics

Embodiments of the invention can also provide for distance metrics, here $d_s$, which take two strings A and B and calculate the distance between them as a score:

$$d_s = F(A, B) \quad (4)$$

This score can either be normalized, taking on a value between 0 and 1, or take on any value of a non-negative natural number. The function F, and the method used by the computer to calculate $d_s$ is dependent on the distance metric being used.

The Levenshtein distance between two strings is the number of edits that would have to be made to transform one string into the other. As an example, the string "KITTEN" can be transformed into "SITTING" by replacing the "K" with an "S", replacing the "E" with an "I", and adding a "G" to the end of the string. This requires three edits, and thus the Levenshtein distance between "KITTEN" and "SITTING" is three. The Levenshtein distance can be calculated using a recursively defined matrix.

Given two strings, $S_1$ and $S_2$, of length N and M respectively, define a matrix A with M+1 rows and N+1 columns and further define a matching coefficient $$q_{j,k} \stackrel{def}{=} \begin{cases} 0, & S_1[j] = S_2[k] \\ 1, & S_1[j] \neq S_2[k] \end{cases} \quad (5a)$$

Where $a_{j,k}$, the value of A at the $j^{th}$ row and $k^{th}$ column is given by:

$$a_{j,k} = \begin{cases} \min\{a_{j-1,k} + 1, a_{j,k-1} + 1, a_{j-1,k-1} + q_{j-1,k-1}\}, & j, k < 1 \\ j - 1, & k = 1 \\ k - 1, & j = 1 \end{cases} \quad (5b)$$

The Levenshtein distance between the two strings $S_1$ and $S_2$ is equal to $a_{M+1,N+1}$. Table 1 below shows an example of calculating the Levenshtein distance between the strings "KITTEN" and "SITTING" using the recursive matrix method:

TABLE 1

Recursive matrix for Kitten and Sitting.

|   | | K | I | T | T | E | N |
|---|---|---|---|---|---|---|---|
|   |   | 0 | 1 | 2 | 3 | 4 | 5 | 6 |
| S | 1 | 1 | 2 | 3 | 4 | 5 | 6 |
| I | 2 | 2 | 1 | 2 | 3 | 4 | 5 |
| T | 3 | 3 | 2 | 1 | 2 | 3 | 4 |
| T | 4 | 4 | 3 | 2 | 1 | 2 | 3 |
| I | 5 | 5 | 4 | 3 | 2 | 2 | 3 |
| N | 6 | 6 | 5 | 4 | 3 | 3 | 2 |
| G | 7 | 7 | 6 | 5 | 4 | 4 | 3 |

The Levenshtein distance given by the recursive matrix method is the bottom right-most box, and equals three.

The Levenshtein distance can be normalized by dividing the Levenshtein distance by the length of the longer string. In the case of "KITTEN" and "SITTING," the normalized Levenshtein distance is 3/7 or approximately 0.43.

The Levenshtein distance can also be normalized by dividing the Levenshtein distance by the length of its alignment. As an example in table 2, consider the strings "KITTEN" and "SKID":

TABLE 2

Alignment table for Kitten and Skid.

|   | K | I | T | T | E | N |
|---|---|---|---|---|---|---|
| S | K | I | D |   |   |   |

The alignment refers to the manner in which the two strings are lined up with one another. In this case, "SKID" is offset by one character in order to line up with the substring "KI" in "KITTEN." The length of the alignment is seven, as there are seven possible character positions in the alignment. If the Levenshtein distance between "KITTEN" and "SKID" is 5, and the length of this alignment is 7, the normalized Levenshtein distance is 5/7 or approximately 0.71.

Levenshtein long alignment refers to the alignment normalized Levenshtein distance when the alignment is maximum length. Levenshtein short alignment refers to the alignment normalized Levenshtein distance when the alignment is the minimum length.

The Hamming distance $d_H$ can be calculated with formula 6a:

$$d_H = \Sigma_i^{i_{max}} q_i \qquad (6a)$$

where $q_i$ is defined:

$$q_i = \begin{cases} 0, & S_1[i] = S_2[i] \\ 1, & S_1[i] \neq S_2[i] \end{cases} \qquad (6b)$$

where $S_1$ and $S_2$ are the two strings being compared and $S_1[i]$ is the $i^{th}$ character of $S_1$. In other words, the Hamming distance is calculated by counting the number of positions in which the characters at that position differ between the two strings.

The Jaccard distance $d_J$ between two strings $S_A$ and $S_B$ is first calculated by constructing a set of n-grams, A and B corresponding to the n-grams composing each string, then calculating:

$$d_J = 1 - \frac{|A \cap B|}{|A \cup B|} \qquad (7)$$

The Jaccard distance is thus 1 minus the number of n-grams the string shares in common divided by the total number of unique n-grams in both strings. The Jaccard distance is normalized, and can only take on a value between 0 and 1. As n increases, the sensitivity of the Jaccard distance metric also increases. At n=1, the Jaccard distance is completely insensitive to the order of characters. at n=$|S_a|=|S_b|$, the Jaccard distance will be 1 unless the strings are exactly identical.

The Jaro-Winkler distance is calculated by first calculating the Jaro score between two strings. The Jaro score $d_j$ is given by equation 8a:

$$d_j = \begin{cases} 0 & \text{if } m = 0 \\ \frac{1}{3}\left(\frac{m}{|s_1|} + \frac{m}{|s_2|} + \frac{m-t}{m}\right) & \text{otherwise} \end{cases} \qquad (8a)$$

Where m is the number of matching characters, t is the number of transpositions, $|s_1|$ is the length of the first string and $|s_2|$ is the length of the second string. Characters are only considered matching if they are the same and not farther than a number of characters given by the expression 8b:

$$\left\lfloor \frac{\max(|s_1|, |s_2|)}{2} \right\rfloor - 1 \qquad (8b)$$

The Jaro-Winkler score is then calculated using formula 7c:

$$d_w = d_j + (lp(1 - d_j)) \qquad (8c)$$

Where $d_w$ is the Jaro-Winkler score, l is the length of common prefix up to a maximum of 4 characters, and p is a constant scaling factor.

The affine gap is given by the following formula:

$$G = A + B * L \qquad (9)$$

G is the affine gap penalty, A is the "gap open penalty", B is the "gap extension penalty" and L is the gap extension length. A gap is defined as a sequence in which the characters do not match between the two strings. The gap length is the number of characters included in a given gap beyond the first character. A three character gap has a length of three, but an extension length of two. The affine gap distance $d_g$ is given by the sum of the gap penalties:

$$d_g = \sum_G \qquad (10)$$

For example, the strings "KITTEN" and "SITTING" have three gaps ("K", "I", and "G") each of length 1. The extension length for each gap is 0. Assume a gap open penalty of 2 and a gap extension penalty of 1. Thus the affine gap distance $d_g$=3A=3.

Figure 7:
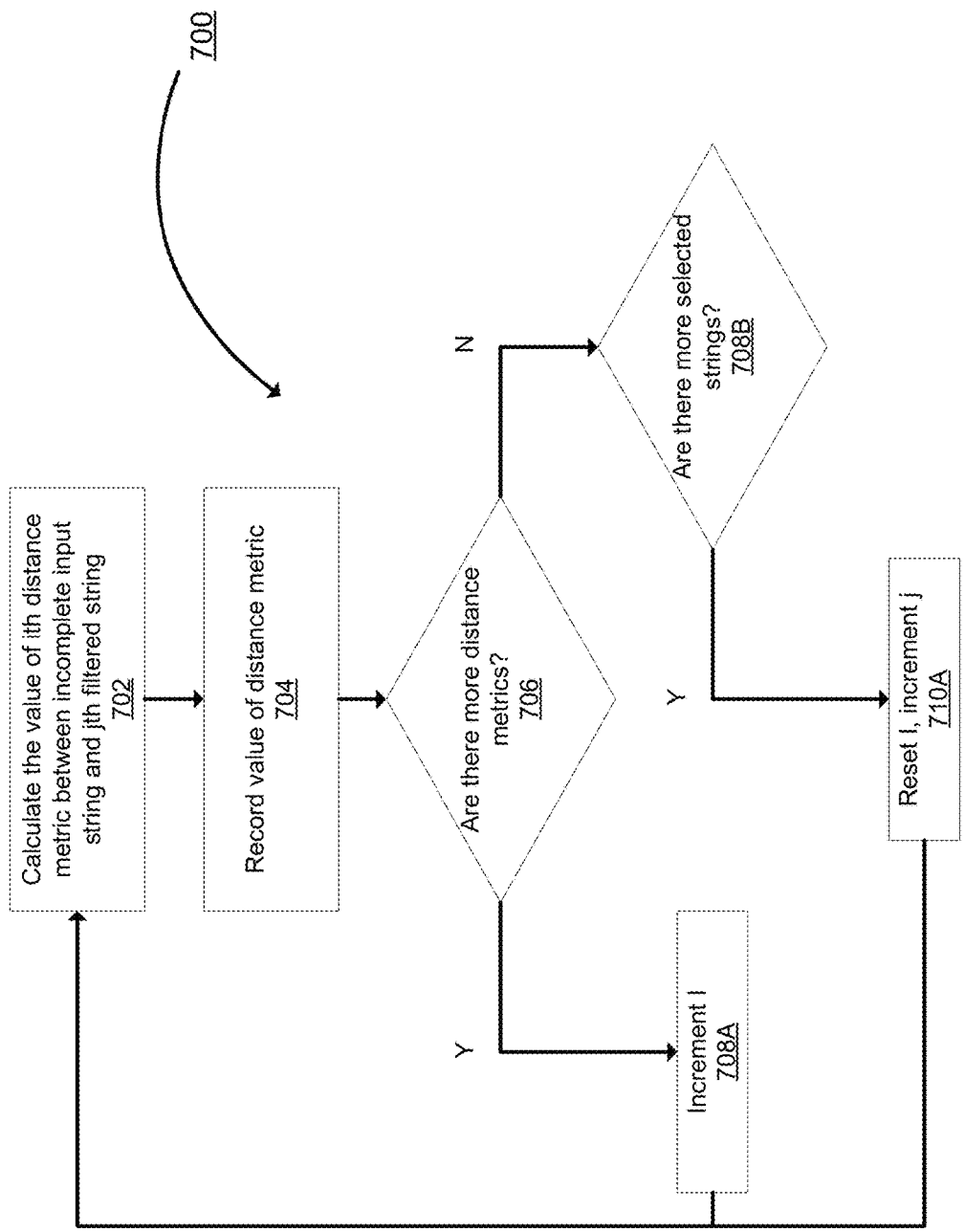
FIG. 7 is a diagram showing a process by which distance metrics can be calculated according to embodiments of the invention.

FIG. 7 shows a process 700 by which a computer system can calculate each of the distance metrics for each of the filtered strings according to some embodiments of the invention. Process 700 can be used to perform block 206B of FIG. 2. Process 700 can be performed by processor 300A of FIG. 3, and may use similarity metric module 300F.

At step 702, the computer calculates the value of the first distance metric between the incomplete input string and the first filtered string. This can be accomplished using basic programming techniques or via special purpose hardware. In the C programming language, for example this could be accomplished with a variable equal to the incomplete input string, an array of filtered strings, a filtered string pointer, an array of distance metric functions and a distance metric pointer. The function pointed to by the distance metric function pointer could be called with the variable comprising the incomplete input string and the filtered string pointed to by the filtered string pointer as its arguments. Each distance metric function could be implemented in numerous ways, utilizing basic arithmetic and logical operations.

As an example, to calculate the Hamming distance, the function could take the incomplete input string and the first filtered string and create two pointers, each pointing to the address containing the first character of each respective string. The function could compare the memory stored at each pointer for equality. If the memory is equal, the characters match. If the memory is unequal, the program could increment a Hamming distance counter. The function could then increment the address pointed to by each pointer and repeat the process. This could continue until each pointer points at a null, end line, or terminating character, such as '\n'. At this point the Hamming distance counter is equal to the Hamming distance between the two strings, which the function could output as an integer or other numeric data type.

Different distance metrics, such as Jaro-Winkler obviously require different functional implementations. Still, each function will require two strings as an input and output a numerical value which indicates the distance between the strings.

The computer then records this value at step 704. This value can be recorded by copying the value on the accumulator in the processor and recording it at a known address in memory.

At step 706 the computer determines if there are more distance metrics to calculate. If so, the computer advances to step 708A, otherwise it advances to step 708B. This can be accomplished using various computer programming techniques or hardware implementations. Pointers, as used in C and C-like languages are could be used. If a pointer is used to point to distance metric functions in an array of distance metric functions, that address of that pointer could be compared to a known final address, which is the address in memory in which the final distance metric is stored. If the address which the pointer points to exceeds the known final address, there are no more distance metrics. Otherwise the memory at the address could be evaluated. If the memory stored at that address is not representative of a distance metric function, then the pointer has advanced beyond the memory containing distance metric functions, and it follows that there are no more distance metrics. A simple conditional statement can from this point be used to advance the program to either step 708A or 708B according to the criteria presented above.

At step 708A, the computer increases its distance metric counter and returns to step 702. For a function pointer pointing to distance metric functions in an array, this simply involves increasing the address which the pointer points to the next address in the array. Returning to step 702 can, as articulated above, simply involve using a conditional "jump" or "goto" statement, as well as any higher level process flow statement, such as "for" or "while" loops which are supported by most programming languages.

At this next iteration of step 702, the computer calculates the value of the second distance metric between the incomplete input string and the first filtered string. Process flow continues until there are no more distance metrics, at which point the processor is at step 708B. Generally this could involve the use of pointers, function pointers, arrays, iterators, conditionals and process flow statements as articulated above.

At step 708B, the computer determines whether or not there are any more selected strings which need to be evaluated. If there are additional strings to evaluate, the computer proceeds to step 710A. Like step 706, this could involve either evaluating the address pointed to by a pointer or the memory at an address pointed to by a pointer. Based on some conditional evaluation of either of these parameters, process flow can continue using a conditional statement.

At step 710A, the computer increases the selected string counter and resets the distance metric counter. Again the computer returns to step 804. Both of tasks could be accomplished using pointers, conditionals and process flow statements as articulated above. There are numerous hardware and software implementations obvious to one skilled in the art which could be used to enact this step.

This time, at step 704, the computer calculates the value of the first distance metric between the incomplete input string and a second filtered string. Process flow continues until each distance metric has been calculated for each filtered string. In this way the computer is able to use the filtered strings in order to produce a set of similarity metrics corresponding to the filtered strings.

IV. Machine Learning Module

As introduced above, the machine learning module 300G is a component, block of memory, or data structure stored on a computer readable medium comprising code that allows for the training and use of a machine learning model.

Figure 8:
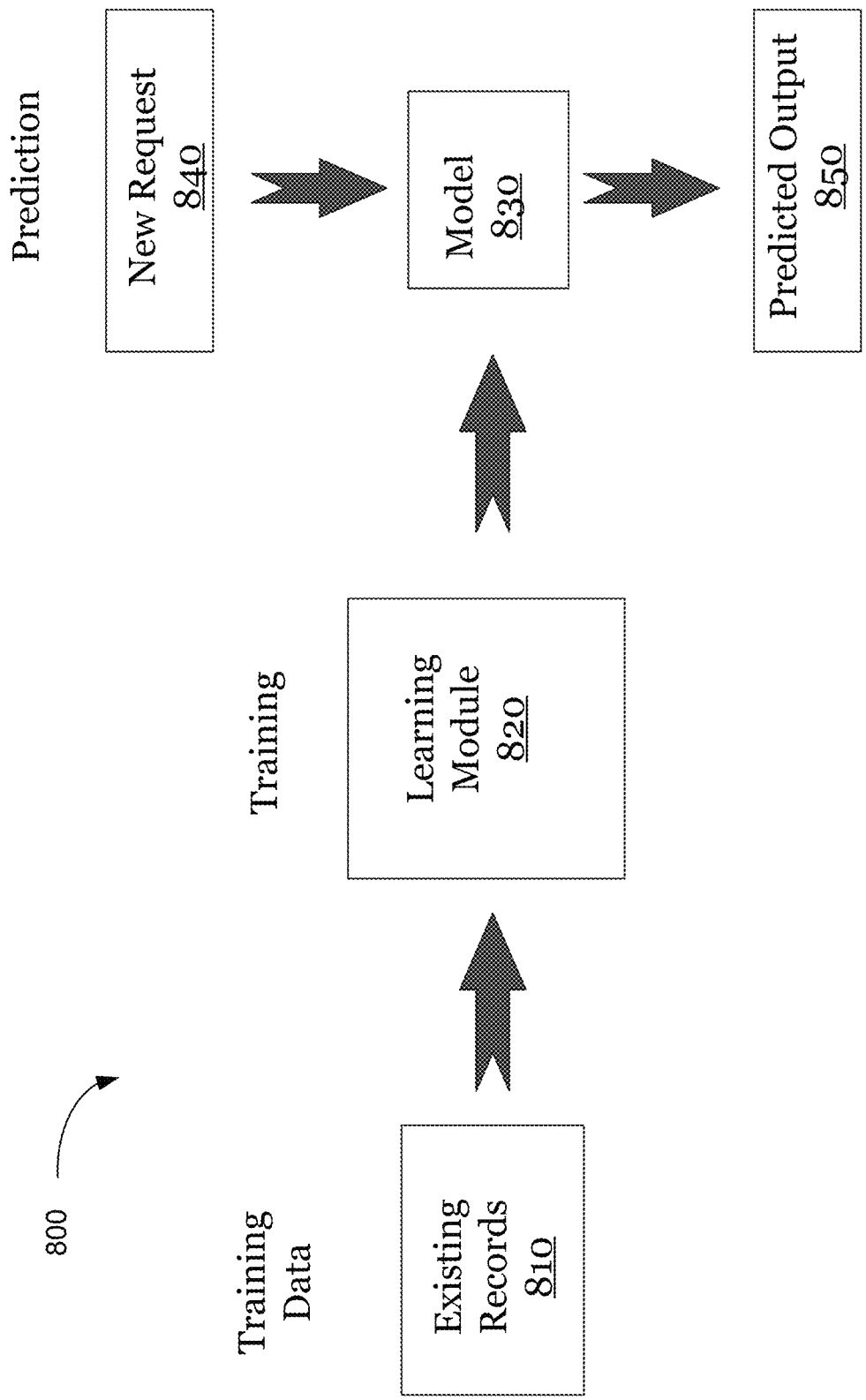
FIG. 8 is a diagram showing an overview of the process of training and using a generic machine learning model according to embodiments of the invention.

FIG. 8 shows a high-level diagram depicting a process 800 for training and using a machine learning model according to some embodiments of the invention. Process 800 starts with training data, shown as existing records 810. The training data can comprise various data samples, where each data sample includes input data and known output data. For an example data sample, the input data can be the similarity metrics between an incomplete input string and a stored string, and the output data can be a classification of whether and an extent of the incomplete string corresponding to the stored string.

Consider the input string "STARBUKS." A person could easily match this string to "STARBUCKS," the name of a coffee chain. Therefore an effective string matching machine learning classifier should also be able to match that input string. The similarity metrics between "STARBUKS" and "STARBUCKS" can be calculated using methods described above or other methods. Then a person could label those similarity metrics as a "match." The similarity metrics and the label are provided to the machine learning model as training data.

Also consider the input string "JJ!!JSZ." A person could easily determine that this string does not match with "STARBUCKS." As such, the similarity metrics between "JJ!!JSZ" and "STARBUCKS" could be determined, labeled as "no match" by a person, and provided to the machine learning model as training data.

After training data is obtained, a learning process can be used to train the model. Learning module 820 is shown receiving existing records 810 and providing model 830 after training has been performed. As data samples include outputs known to correspond to specific inputs, a model can learn the type of inputs that correspond to which outputs, e.g., which similarity metrics correspond to matches. Once model 830 has been trained, it can be used to predict the output for a new request 840 that includes new inputs. For instance, model 830 can determine whether a new image is of a dog. Model 830 is shown providing a predicted output 850 based on new request 840. Examples of predictive output 850 include a classification of a threat, a classification of authentication, or a recommendation. In this manner, the wealth of the training data can be used to create artificial intelligence that can be advantageously used for particular problem.

Embodiments can provide for a machine learning module providing code for the training and application of multiple machine learning models, specifically machine learning classifiers including support vector machine, random forest and logistic regression. Each machine learning model is trained in a different way, but all follow the general overview outlined above and detailed in FIG. 8. The machine learning models accept inputs in the form of similarity metrics and each output a match or no match classification and a similarity score.

The machine learning module can contain code executable by the processor in order to bag the outputs of each of the machine learning models. Bagging is a method by which multiple classifications are combined into a single classification. As an example, consider three machine learning models. Two have classified a set of similarity metrics as a match, and one has classified the set of similarity metrics as a no match. One bagging method could be a majority vote. Since two models have classified the similarity metrics as a match, and only one has classified the similarity metrics as a no match, the bagging process could result in a match classification. In this way, a single match similarity score can be produced from the multiple machine learning model outputs.

In some applications it can be appropriate to weight the bagging process. Using the voting analogy, this could mean that some models are given more votes than others. In a system with seven machine learning models, one model could be given five votes and each other model only given one. This would mean that the single models classification would always be the output classification unless all other models disagreed. This system could be useful if there is a primary model with a high degree of accuracy, and several secondary models with moderate or low accuracy.

A. Support Vector Machine

Some embodiments can make use of a support vector machine (SVM). A support vector machine classifies an input as one of two classes based on its features. In the case of embodiments of the present invention, the features can be the similarity metrics determined by the computer, and the classification is whether or not the input string matches the filtered string corresponding to those features. During training, the SVM is provided with paired similarity metrics and classifications. SVM training involves determining the equation for a hyperplane which satisfies two characteristics. First, the hyperplane must divide a multidimensional feature space such that on one side of the hyperplane are all training data which match one classification, and on the other side are all training data which match the other classification. Second, the hyperplane must be constructed such that the distance in feature space between the hyperplane and the training data is maximized.

A purpose of establishing a hyperplane to cleanly divide the data into two groups is so that classifications on unlabeled data can be made using an expression of the hyperplane. The set of similarity metric can be passed into the expression of the hyperplane. If the value of the expression exceeds the value of the hyperplane, then the input set of similarity metrics belongs to the classification which in the multidimensional feature space is "above" or on one side of the hyperplane. If the value of the expression is less than the expected value of the hyperplane, the input set of similarity metrics belongs to the classification of similarity metrics which is "below" or on the other side of the hyperplane. If the value of the expression exactly equals the expected value of the hyperplane, then the input lies directly on the hyperplane. As a consequence, it is indeterminate which classification the input belongs to.

To elaborate, the computer can produce a classification by evaluating the following equation using the similarity metrics:

$$C = \begin{cases} C_1, & a_1x_1 + a_2x_2 + \ldots + a_{n-1}x_n + a_n < 0 \\ C_2, & a_1x_2 + a_2x_2 + \ldots + a_{n-1}x_n + a_n > 0 \\ \text{undefined}, & a_1x_1 + a_2x_2 + \ldots + a_{n-1}x_n + a_n = 0 \end{cases} \quad (11)$$

Where $x_i$ is the $i^{th}$ similarity feature, a is the $i^{th}$ constant weight. C is the output classification, and $C_1$ and $C_2$ are the first and second training classifications respectively. The equation $a_i x_i + a_2 x_2 + \ldots + a_{n-1} x_{n-1} + a_n = 0$ being the equation found for the hyperplane.

A purpose of maximizing the distance between the training data and the hyperplane is to increase the confidence of the model. A point directly on the hyperplane is completely indeterminate in terms of classification. A point immediately adjacent to the hyperplane can be classified, but not with a great deal of confidence, as a small change in any given similarity metric could result in an indeterminate or entirely different classification. When the equation of the hyperplane is determined such that the distance between the training data and the hyperplane is maximized, the confidence of the model in terms of its classification of training data is maximized.

Effectively, training the SVM involves determining the weights $a_1$ to $a_n$ such that the two above characteristics, namely that the hyperplane separates the training data by classification, and that the hyperplane is determined such that the distance between the hyperplane and the training data is maximized.

This can be determined by finding a family of hyperplane equations each which separate the training data, and calculating the distance between each of the hyperplanes and the training data. Then a convex optimization can be performed to find which of the hyperplane equations maximizes the distance between the hyperplane and the training data.

In some cases, no linear combination of features and weights can be found in order to produce a hyperplane that separates the training data by classification. In this case, the kernel trick can be employed. The kernel trick involves increasing the dimensionality of the feature space. In a higher dimensional feature space it is easier to determine the equation of a hyperplane that separates the training data.

Embodiments can produce a similarity score based on results of the classification. This can be accomplished by determining the distance in the feature space between the input and the closest point on the hyperplane. As the feature space distance increases, the similarity score increases. Some embodiments can provide for normalized similarity scores, where the similarity score equals 1 when the distance between the hyperplane and the input equals or exceeds the greatest distance between a training data point with the same classification and the closest point on the hyperplane. This similarity score decreases as an input approaches the closest point on the hyperplane, reaching 0 when the point lies directly on the hyperplane.

Determining the distance between a hyperplane and a point could be accomplished using vector algebra. For a plane and a point, the shortest distance between that plane and the point is the distance along the normal vector which extends from the plane to that point. In the case of embodiments of the invention, the "point" is the set of input similarity metrics, and the "plane" is the hyperplane separating the classifications, given by the equation $a_1 x_1 + a_2 x_2 + \ldots + a_{n-1} x_{n-1} + a_n = 0$. For n input similarity metrics $s_1$ to $s_n$, the shortest distance between those similarity metrics and the hyperplane in the feature space could be given by the following formula:

$$d = \frac{|a_1 s_1 + a_2 s_2 + \ldots + a_{n-1} s_{n-1} + a_n|}{\sqrt{a_1^2 + a_2^2 + \ldots + a_{n-1}^2}} \quad (12)$$

Figure 9:
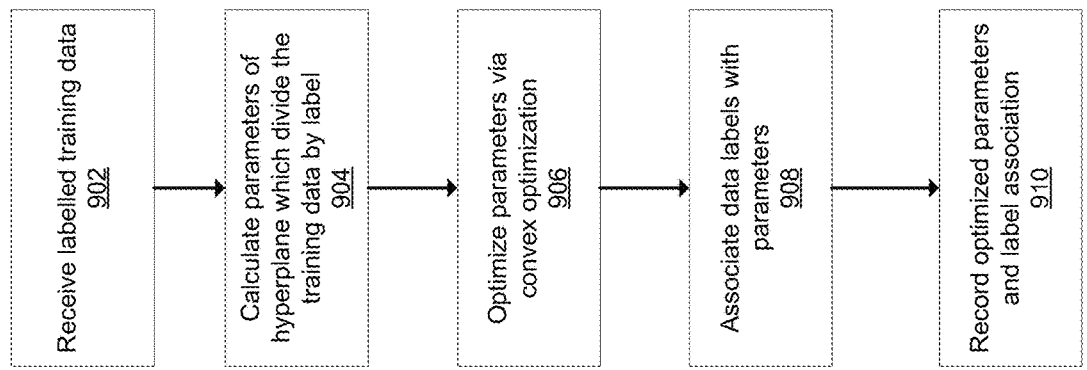
FIG. 9 is a diagram showing the process used to train a support vector machine according to embodiments of the invention.
Figure 9:
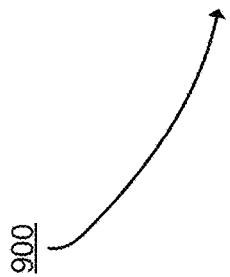

This distance can either be equal to or proportional to the similarity score used in methods according to some embodiments of the invention FIG. 9 displays a flowchart of the process used to train a SVM according to some embodiments of the invention.

At step 902, the computer receives the labelled training data. This training data could be received via the computer's network interface, or via some other interfacing device, such as a keyboard or a touch screen. This training data could comprise multiple sets of similarity metrics along with labels indicating the classification to which the set of similarity metrics belongs. The labels can be determined manually for the training samples, thereby ensuring accuracy.

At step 904, the processor determines the relationships governing the coefficients of a hyperplane that can separate the training data by label.

At step 906, using convex optimization, the processor determines a single hyperplane expression using the relationships which govern the coefficients of hyperplanes which can separate the training data by label. This single hyperplane is selected such that the distance between the training data and the hyperplane in maximized. This hyperplane is known as the maximum margin hyperplane.

At step 908, the processor associates each label with a side of the maximum margin hyperplane. This could involve constructing a conditional statement which associates one classification with one outcome and a second classification with the other outcome. This could for example be accomplished using equation (11), wherein one classification is associated with an expression being greater than zero and a second classification is associated with that expression being less than zero.

Figure 10:
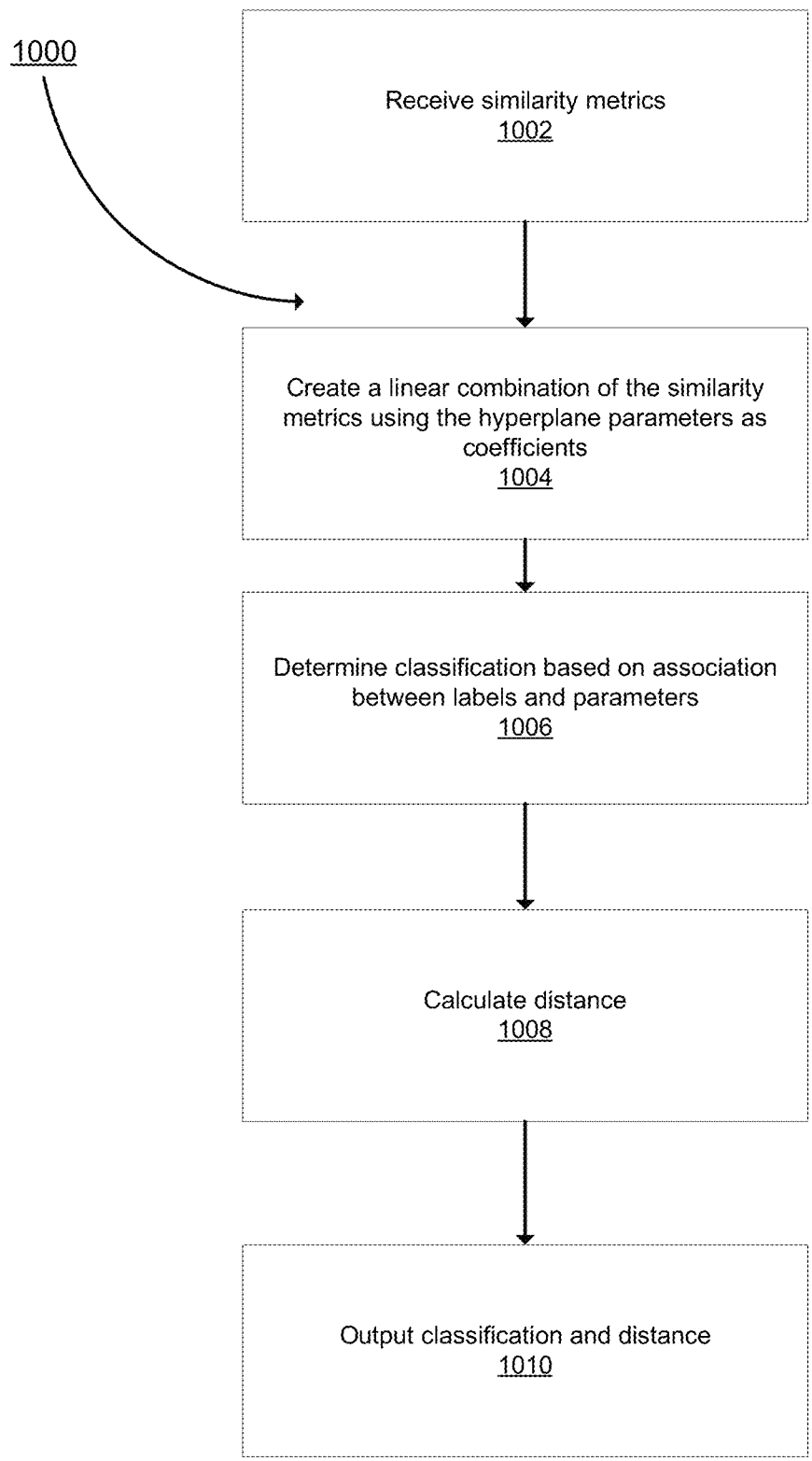
FIG. 10 is a diagram showing the process used to produce a classification and similarity score using a support vector machine according to embodiments of the invention.

At step 910, the processor records the optimization parameters and label associations for use FIG. 10 displays a flowchart detailing a process used to produce a classification and similarity score from the SVM during production according to embodiments of the invention.

At step 1002, the SVM receives the similarity metrics corresponding to a filtered string. These similarity metrics could be received over the network interface of the computer, or via another interface, such as a user interface like a keyboard or a touch screen.

At step 1004, each similarity metric is used in evaluating the expression for the hyperplane determined in the previous process. This can be accomplished by multiplying each similarity metric by its corresponding coefficient in the equation for the hyperplane and summing the products up.

At step 1006, the processor then determines whether or not the resulting value is less than, equal to, or greater than to the expected value for the hyperplane. This involves evaluating the linear combination created in step 1004, then evaluating the results according to the associations developed between the classifications and the hyperplane during training.

At step 1008, the processor determines the distance between the hyperplane and the set of similarity metrics. This can be accomplished using vector arithmetic as in equation (12), which enables the distance between a plane and a point to be calculated easily. Numerous other methods exist which could be used to determine the distance between the set of similarity metrics and the hyperplane.

At step 1010, the processor outputs the classification and calculated distance. These values can be used in future processes, particularly bagging in order to produce the final classification.

Figure 11:
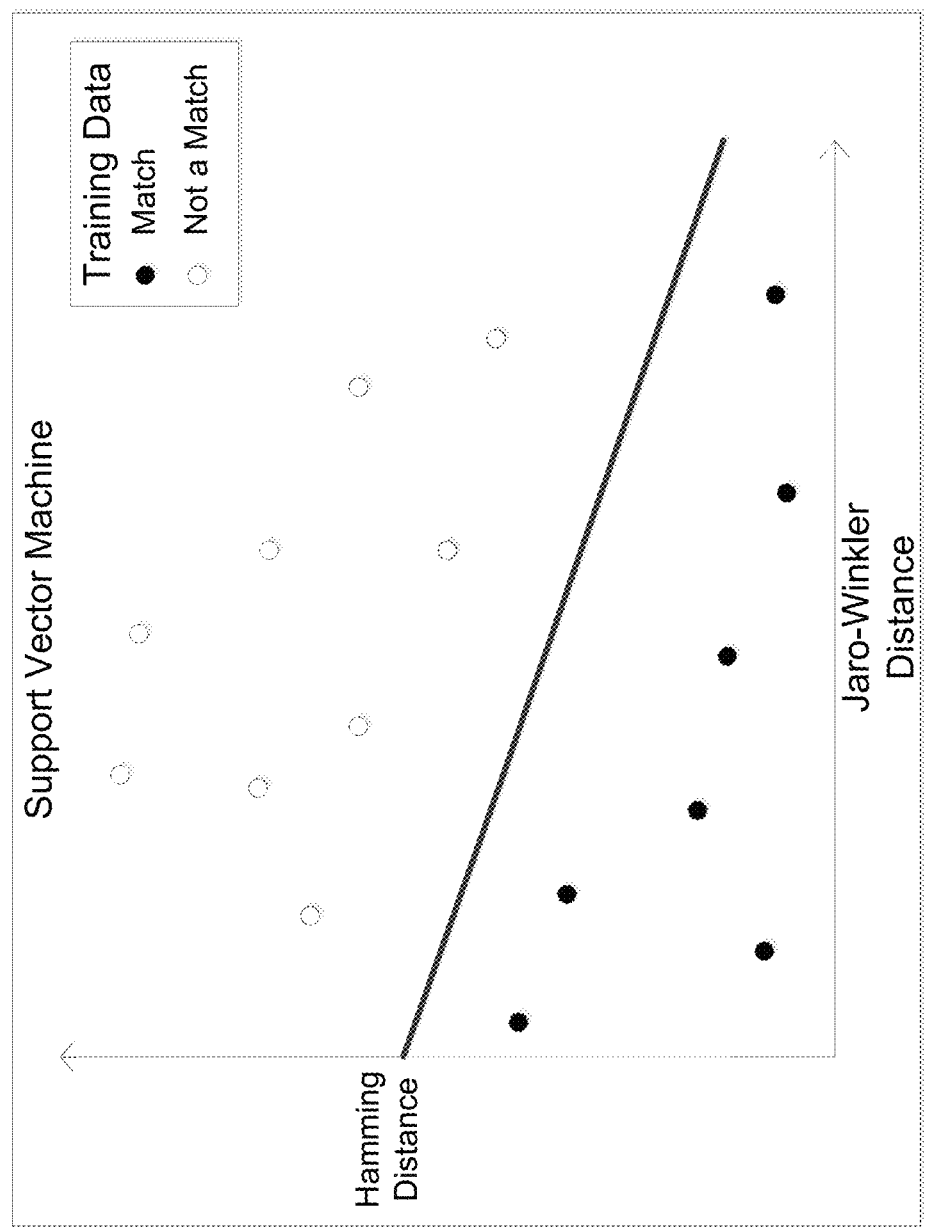
FIG. 11 is a diagram showing a plot illustrates a simple example of training a support vector machine according to embodiments of the invention.

FIG. 11 is a simple plot exemplifying a multidimensional feature space and hyperplane which might be determined according to methods used in some embodiments of the invention. In this example, the feature space is a two dimensional feature space, where one feature is the Hamming distance metric and the other feature is the Jaro-Winkler Distance metric. Labelled training data, corresponding to either a match or not a match is graphed within this feature space. The hyperplane, in the case of a two dimensional feature space is a simple line. This line divides the data by classification and is position to maximize the distance between the training data and the hyperplane.

B. Random Forest

Other embodiments can use a random forest, which is another machine learning model. The random forest model is a collection of random decision trees. Similarity metrics are passed to each of the trees, and each tree is capable of producing a classification result. In the case of the present invention, this result can be whether or not the incomplete input string matches one of the filtered strings. The results are then bagged to produce a single classification output using a simple majority vote. The final output is whichever classification received the majority vote, and the similarity score, C is given by formula 13:

$$C = \frac{V_W}{V_W + V_L} \tag{13}$$

Where $V_W$ is the number of votes for the winning classification, and $V_L$ is the number of votes for the losing classification.

The training process for a random forest involves initially collecting labelled training data. This training data can compose a number of similarity metrics along with a label indicating whether or not the training data corresponds to a match or no match. The machine learning module then randomly produces some predetermined number of subsets of the training data. Each of these subsets will correspond to a random tree in the forest. Each tree adds nodes and branches in order to repeatedly divide its subset, such that eventually each piece of training data from its subset is classified in the leaf nodes. In this way each tree has a different, random method of classifying inputs.

Figure 12:
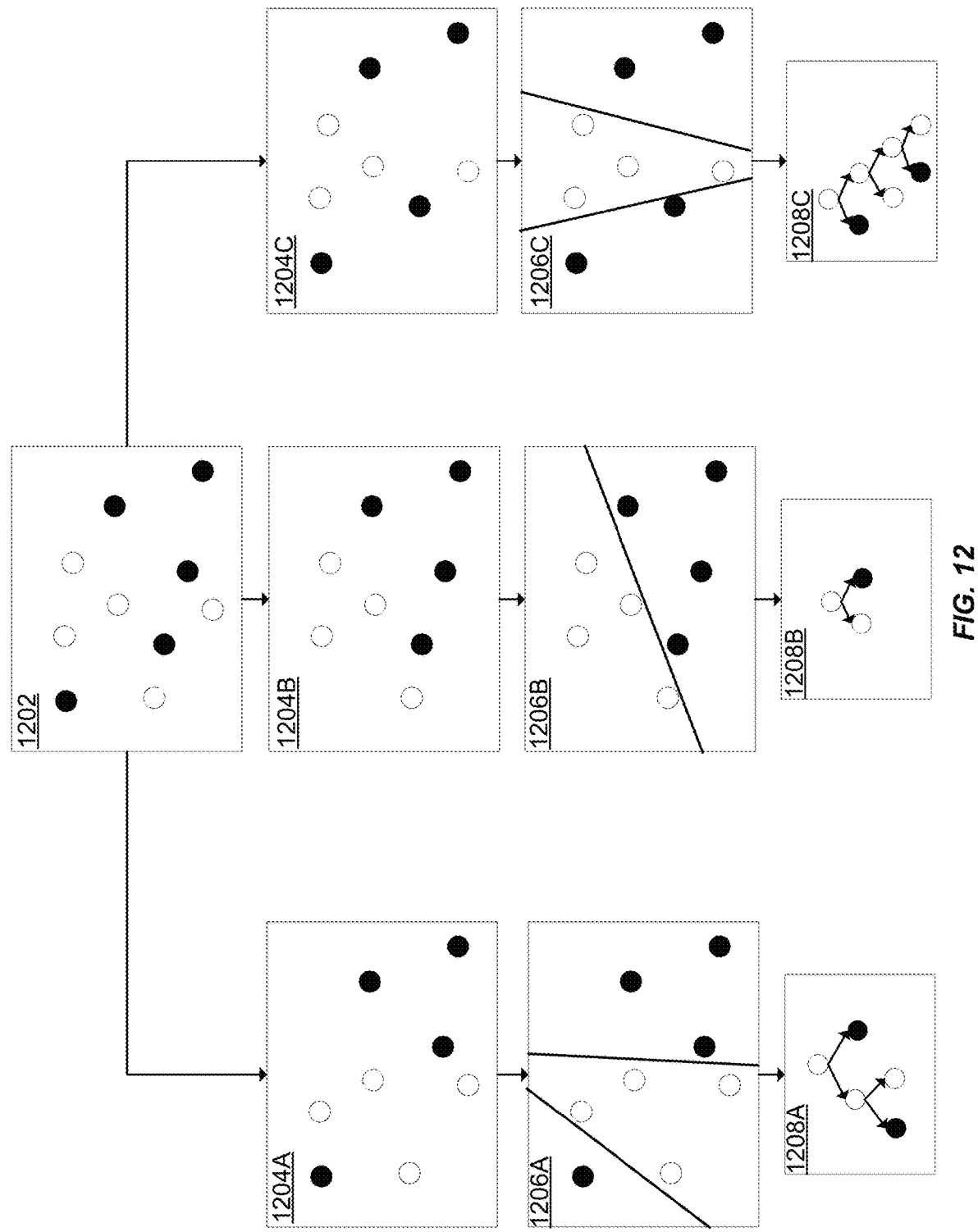
FIG. 12 is a diagram showing a simple example of training a random forest according to embodiments of the invention.

FIG. 12 shows a hybrid plot and flowchart diagram displaying a simplified example of how a random forest can be trained from a set of training data according to some embodiments of the invention.

At plot 1202, labelled training data occupies a two-dimensional feature space. The processor, using code from the machine learning module, randomly produces subsets of this training data (1204A-C). This can be accomplished using any number of sampling procedures, such as reservoir sampling.

In the subset plots 1204A-C, each subset has one less data point from each classification. Other implementations could involve even smaller subsets of data. Random subsets of data can prevent the entire forest from becoming overtrained.

Next, in plots 1206A-C, the feature space is subdivided so that each subset of training data occupies a given region. The subdividing is very dependent on the data subset; in this way, each tree produces a radically different subdivision.

In plots 1208A-C, a random tree is constructed based on each subdivision. In most cases, the subdivisions will be quite a bit more complex, and might involve subdivisions being further and further divided.

Figure 13:
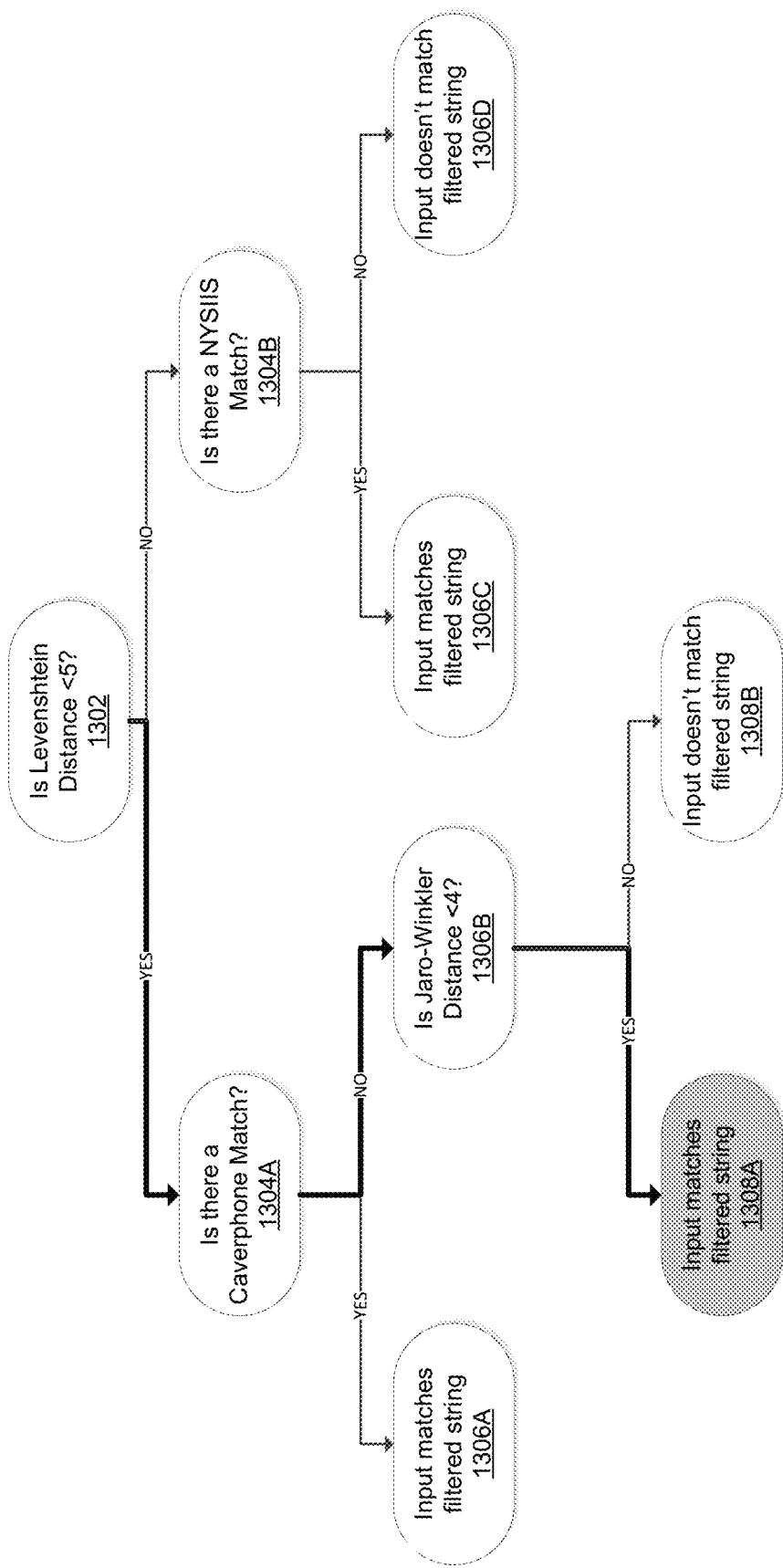
FIG. 13 is a diagram showing a simple example of a random tree according to embodiments of the invention.

FIG. 13 shows a simple example of a random tree in the form of a decision tree that might be used in some embodiments of the invention. Each branch involves the processor making a determination and each leaf is a classification.

In FIG. 13, there are 4 branches, the root branch 1302, and branches 1304A, 1304B, and 1306B. Since the tree is a decision tree, each branch involves a decision or judgement that needs to be made by the processor. There are also 5 leaves, each corresponding to a similarity metric classification of match or no match. In FIG. 13, the bolded or thick lines indicate the patch taken by the processor through the tree, and the filled circle indicates the output classification.

Root branch 1302 asks whether or not the Levenshtein distance is less than 5. If so, the root branch directs the processor to move to branch 1304A, if not the root branch directs the processor to move to 1304B.

Branch 1304A asks whether or not there is a Caverphone match, or in other words whether the Caverphone phonetic metric is equal to 1. If there is a Caverphone match, the branch directs the processor to move to leaf 1306A, otherwise, the branch directs the processor to move to leaf 1306B.

Leaf 1306A classifies the similarity metrics as a match. Branch 1306B asks whether or not the Jaro-Winkler distance is less than 4. If so, branch 1306B directs the processor to move to leaf 1308A. If not, the branch directs the processor to move to leaf 1308B.

Leaf 1308A classifies the similarity metrics as a match. Leaf 1308B classifies the similarity metrics as a no match.

Branch 1304B asks whether or not there is an NYSIIS match, or in other words whether the NYSIIS phonetic metric is equal to 1. If there is a NYSIIS match, the branch directs the processor to move to leaf 1306C. If not, leaf 1304B directs the processor to move to 1306D.

Leaf 1306C classifies the similarity metrics as a match. Leaf 1306D classifies the similarity metrics as a no match.

The processor begins at the root branch 1302 and determines whether or not the Levenshtein distance metric is less than 5. Upon determining that the Levenshtein distance metric is less than 5, the processor moves onto the branch corresponding to that result 1304A.

At branch 1304A, the processor evaluates whether or not the Caverphone phonetic metric equals 1. Upon determining that there is no Caverphone match, the processor moves to branch 1306B. At branch 1306B the processor evaluates whether the Jaro-Winkler distance is less than 4. This determination signals to the processor to proceed to leaf 1308A, which classifies the similarity metrics as a match.

FIG. 13 illustrates the "random" nature of the random tree, because each feature subset is different. Many trees will have different or seemingly random ways of evaluating the feature set.

Figure 14:
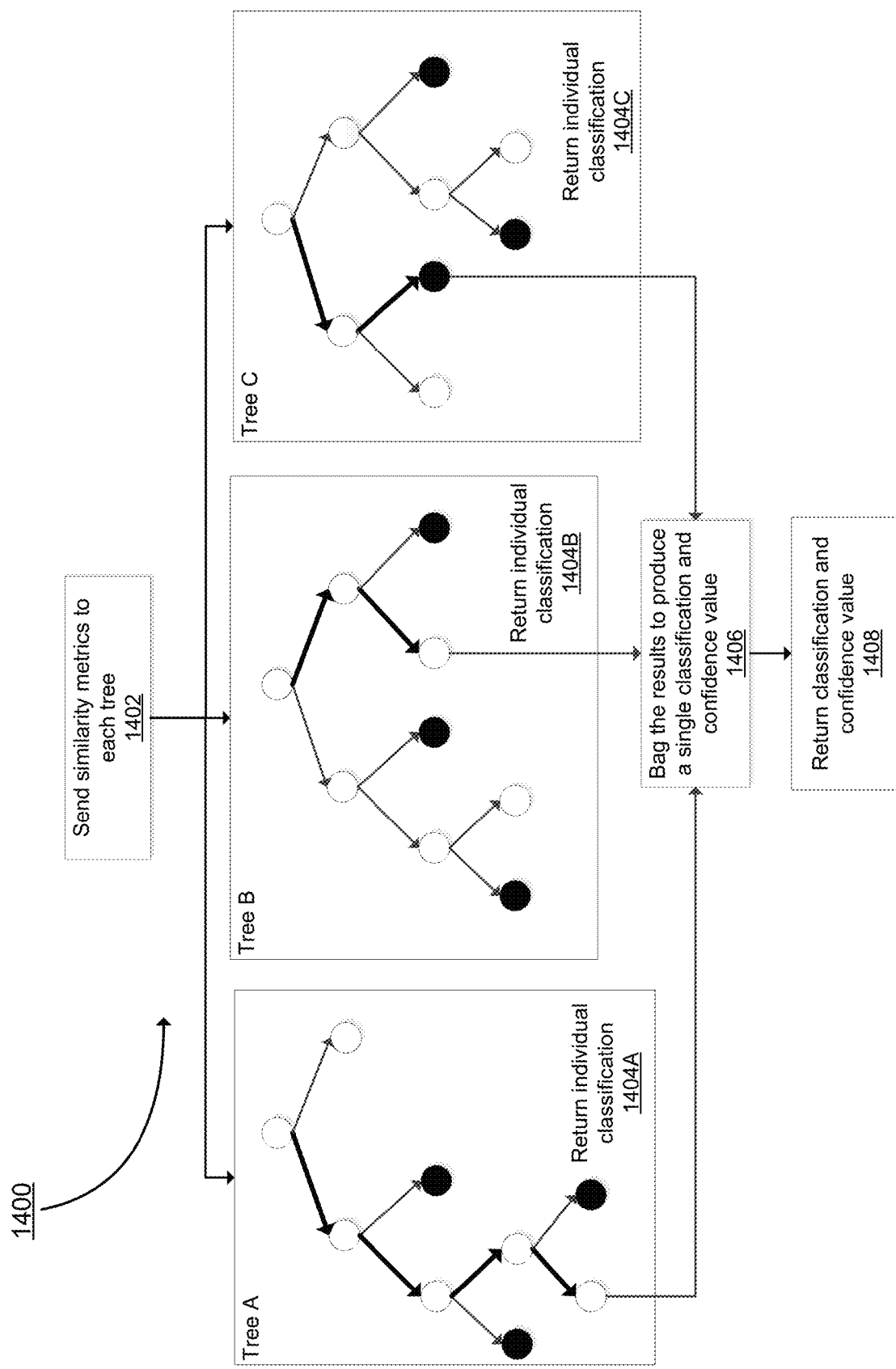
FIG. 14 is a diagram showing the process used to produce a classification and similarity score using a random forest according to embodiments of the invention.

FIG. 14 illustrates a hybrid plot and flowchart diagram detailing a simple example of a random forest classifying input similarity metrics according to some embodiments of the invention. In FIG. 14, The trees are represented by directed graphs composed of white or black circles and bolded or unbolded arrows. The top, or highest circle in each tree is the root branch. Each branch possesses two arrows pointing to lower branches or leaves. All branches are white circles, and leaves can either be white circles or black circles. A white leaf indicates a match classification, and a black leaf indicates a no match classification. Bolded or thick arrows in each decision tree correspond to the path the processor took through that decision tree in evaluating it. In tree A shown in step 1404A, the processor moved to the left twice, to the right once, and then to the left again to arrive at a leaf node. Trees B and C each took different paths because the structure of each tree is different.

At step 1402, the processor sends each set of similarity metrics to each tree in the random forest. In this example, there are three trees, A, B, and C. The same set of similarity metrics is provided, but the decision trees have different structures, e.g., different branches that perform different tests on the similarity metrics.

At steps 1404A-C, trees A through C produce their respective classification for the similarity metrics. The respective classification may differ for each tree.

At step 1406, the forest then bags the result to produce a single classification.

At step 1408, the forest returns the classification and similarity score. In this way, the random forest produces a classification and similarity score using a collection of trained random trees when presented with an input in the form of similarity metrics.

C. Logistic Regression

Logistic regression is a method by which training data is used to make a logistic curve. Much like linear regression takes a set of data points and produces a line that best fits the data points, logistic regression takes a set of training data and produces a logistic curve bound between 0 and 1. When a set of similarity metrics are provided to the logistic regression machine learning model, the model evaluates the formula defining the logistics curve. A value of 1 indicates a given classification and 100% confidence in that classification. As the value decreases, the confidence and the similarity score decreases. At a value of 0.5, the machine learning model cannot definitively classify the set of similarity metrics. It can only be 50% confident in either classification. As the logistic value goes below 0.5, the machine learning model changes its classification. The confidence in that classification increases from 50% as the logistic value approaches 0, at which point the model is 100% confident in its classification.

The logistic curve is defined by the formula:

$$L = \frac{1}{1 + e^{-X}} \tag{14a}$$

Where X is a linear combination of the individual features $x_i$ and weights $\beta_i$:

$$X = \beta_0 x_0 + \beta_1 x_1 + \ldots + \beta_n x_n \tag{14b}$$

with each weight determined using the statistical process of maximum likelihood estimation (MLE).

MILE is a process by which a sample of independent and identically distributed observations are used to predict an unknown probability density function based on assumptions regarding the nature of the probability density function. The independent and identically distributed observations can be the labelled training data, and the probability density function can be assumed to be a logistic curve.

MILE involves determining a maximum likelihood estimator X, which most closely matches the true parameter corresponding to that distribution. To this end, a likelihood function is defined, and a value or expression for X is determined which maximizes this likelihood function. In many cases, there is no closed-form solution to the likelihood problem, in which case the computer can use numerical methods to determine the maximum likelihood estimator.

Figure 15:
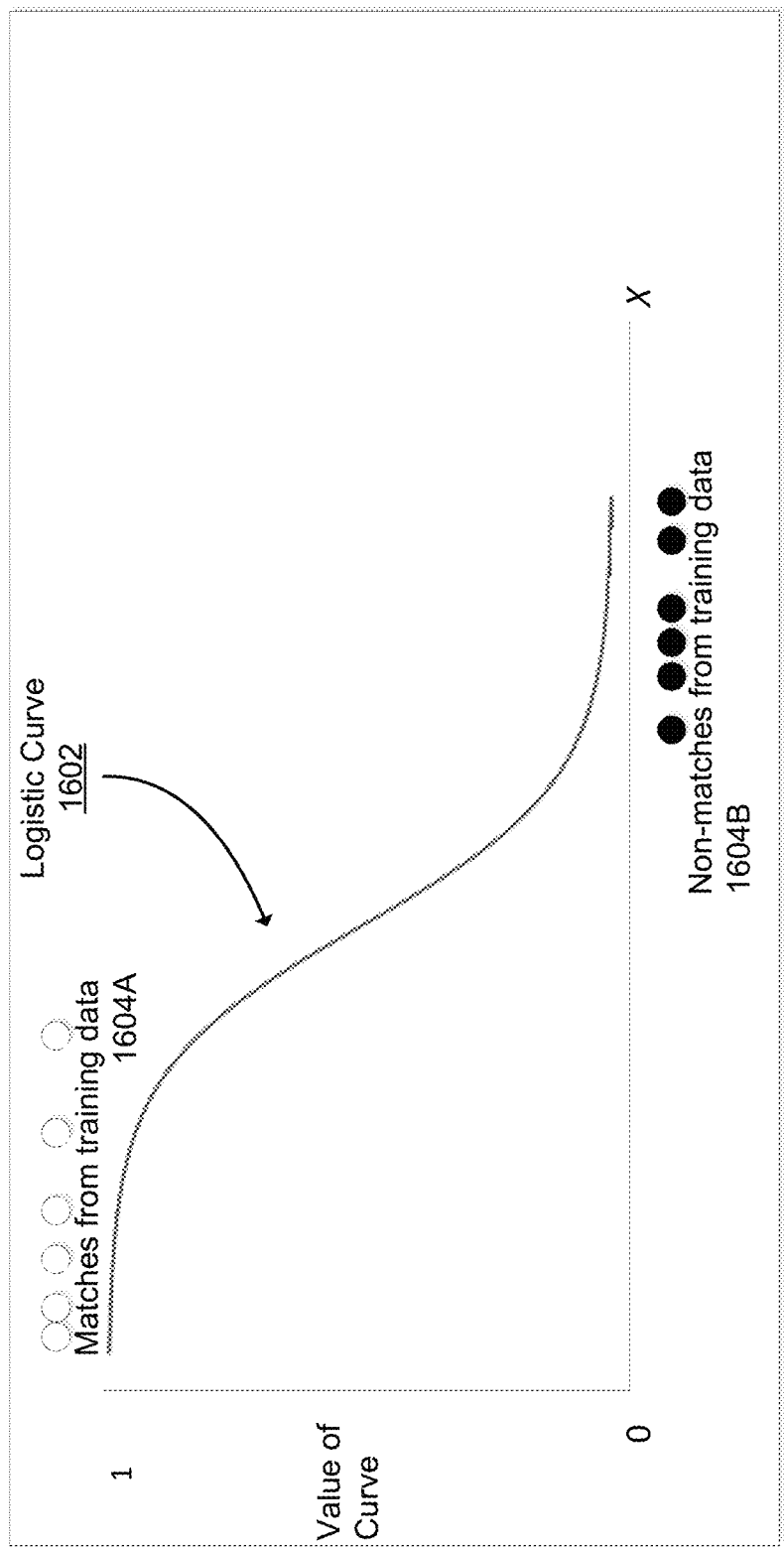
FIG. 15 is a diagram showing a simple example of a logistic curve used in logistic regression machine learning models according to embodiments of the invention.

FIG. 15 shows an example of a logistics curve 1502 which might be produced by logistic regression training according to some embodiments of the invention. The x-axis is the value of the estimator given by formula 14b and the y-axis is the corresponding value of the logistic function given by formula 14a.

In the present example, labelled match training data (1504A), and labelled non-match training data (1504B) were used to determine the values of the weights $\beta_i$, such that the value of X is small for similarity metrics like those seen in the labelled match training data and large for similarity metrics like those seen in the labelled non-match training data.

In production, for a new set of unlabeled similarity metrics, the computer can evaluate the value of X and the logistic curve based on those similarity metrics and provide a classification and similarity score based on the value of the logistic curve.

V. Method of Identifying a Corresponding String

Each of the previous sections discussed individual features, techniques, and elements which would enable a system to perform the method of identifying a corresponding string based on an incomplete input string. This section elaborates on the interplay between these features which enables the entire method to be completed.

A. Flowchart

Figure 16:
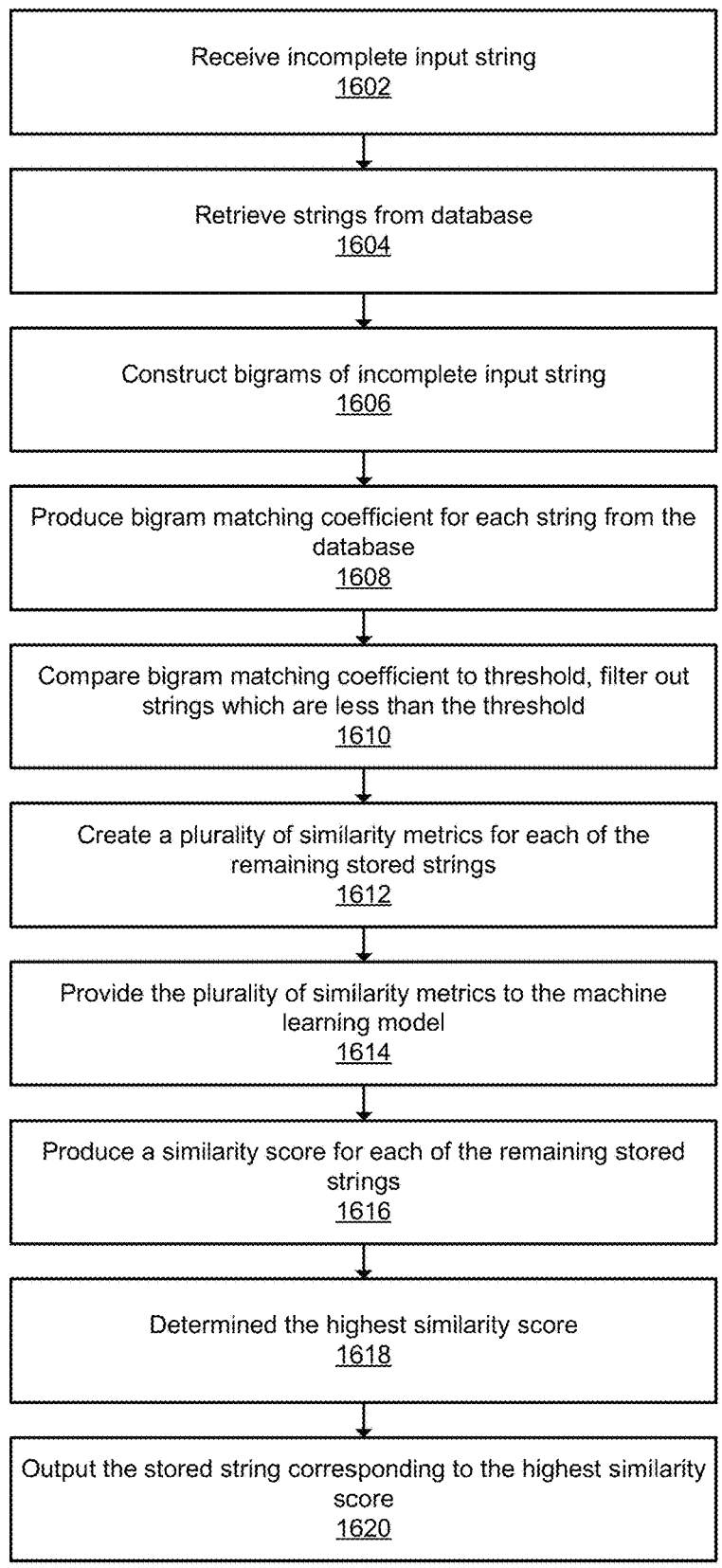
FIG. 16 is a detailed flowchart of the method for determining a corresponding string stored in memory based on an incomplete input string according to embodiments of the invention.

FIG. 16 displays a flowchart detailing an example method 1600 of identifying a corresponding string based on an incomplete input string according to some embodiments of the invention. Method 1600 may be performed in a manner consistent with descriptions of computers 102 and 300.

At step 1602, the system receives an incomplete input string. This string could be something like "Starbuks," The business "Starbucks" but missing the letter C. The goal of the method is to take the incomplete input string and produce "Starbucks." The incomplete string may be received as a query from a user or from another computer. The incomplete string may be provided in a particular field of a message from another computer, where the field has a particular label.

At step 1604, strings are received from a database. For example, the computer could query the database in order to retrieve strings stored in memory. If location information (e.g., information specifying a particular database or section of a database) was furnished with the incomplete input string, this location information can be used as part of the database query. This can eliminate millions of strings which are irrelevant, saving considerable computing time. In some cases, the bigrams each string stored in memory have been predetermined. When this is the case, the computer can also request the bigrams of each returned string, along with that string from the database.

At step 1606, the computer can optionally construct the bigrams of the incomplete input string using methods and techniques described in section II.

At step 1608, these bigrams can optionally be compared with each set of bigrams from each of the stored strings provided by the database. In this way the computer can create a bigram matching coefficient for each stored string.

At step 1610, the computer can optionally compare each bigram matching coefficient to predetermined threshold. Each string with a bigram matching coefficient less than the threshold can be thrown out. Each string with a bigram matching coefficient greater than the threshold can be kept and used for further steps in the method.

At step 1612, the computer can create a set of similarity metrics for each of the remaining stored strings. These similarity metrics can include both phonetic and distance metrics, and are articulated in more detail in section III. The creation of these similarity metrics depends on the nature of the metric being created. Hamming distance can be produced with a simple "compare and count" algorithm. Jaro-Winkler is considerably more involved by comparison. Some example formula and methods which can be used to calculate these distance metrics are included in section III.

At step 1614, the computer can then provide each set of similarity metrics in turn to the trained machine learning model. This model can take the similarity metrics and use them as inputs to one of several possible machine learning models, such as SVM, Random Forest, or Logistic Regression. Implementation and details of these machine learning models is discussed in section IV. Each "sub" machine learning model can provide its own classification and similarity score, which can be combined by the processor, e.g., using a bagging process as described above, to produce a single similarity score.

At step 1616, each set of similarity metrics for each remaining stored string is processed in turn by the machine learning model to determine a classification of whether a string matches (or at least possibly matches) the input string. The result is a classification and similarity score associated with each remaining stored string. In other words, if 10,000 stored strings remain after location and bigram filtration, there will be 10,000 similarity scores, each corresponding to one of those stored strings.

At step 1618, the computer can now determine which similarity score is the highest, e.g., for the strings that are identified as matching the input string. This highest similarity score should correspond to the string that corresponds to the incomplete input string. This can be accomplished by comparing each similarity score to the current highest similarity score. For 10,000 similarity scores this will require 10,000 comparisons.

At step 1620, once the computer has determined which similarity score is the highest, it can simply output the stored string corresponding to that similarity score. In doing so a corresponding string stored in memory has been identified based on an incomplete input string.

B. Block Diagram

Figure 17:
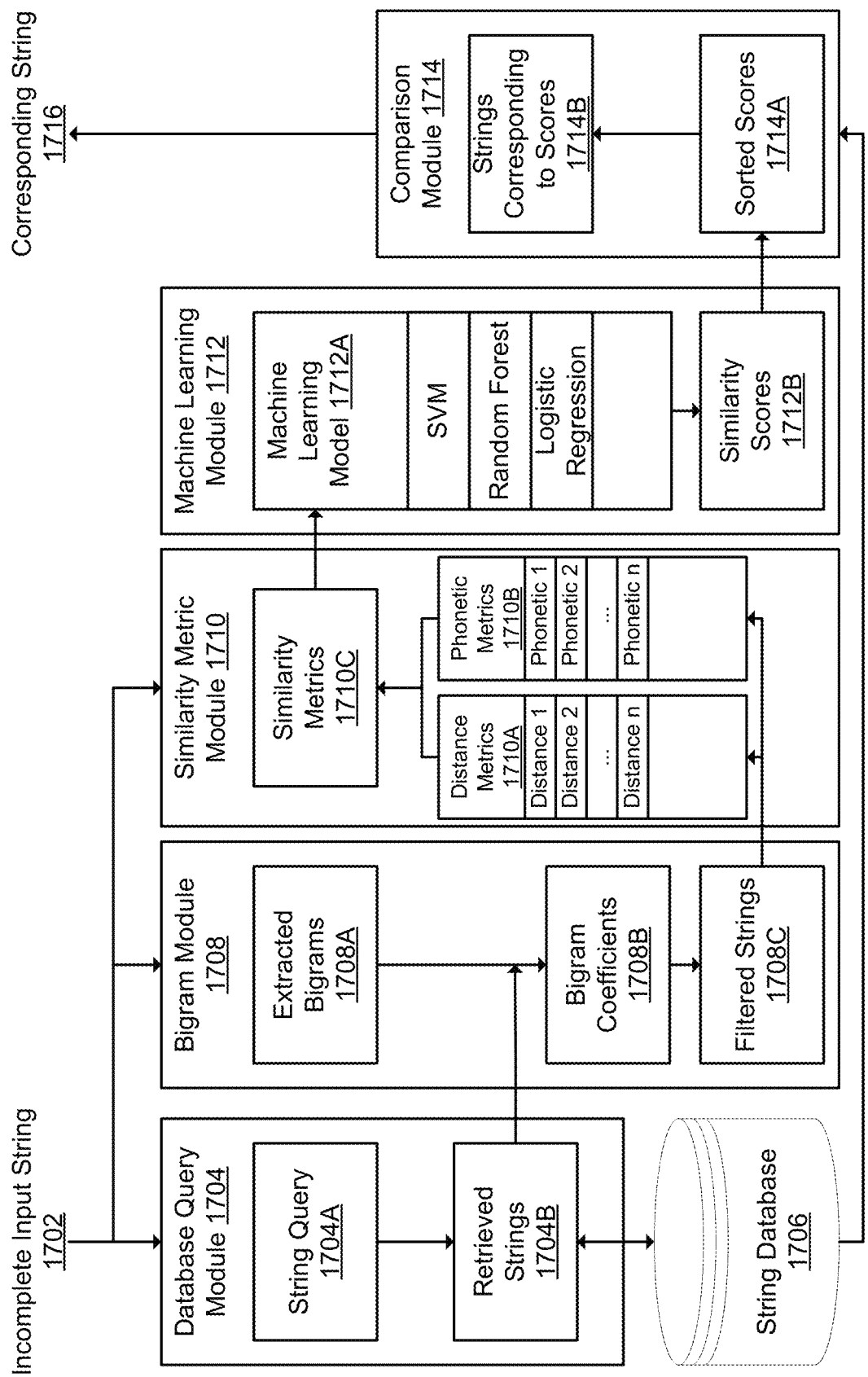
FIG. 17 is a detailed block diagram showing interactions between computer modules, the string database, and the incomplete input string in order to produce a corresponding string stored in memory according to embodiments of the invention.

FIG. 17 displays a more detailed block diagram of a system capable of enacting the method according to embodiments of the invention. The diagram displays the interplay between the input, database, and modules.

An incomplete input string 1702 is provided or received by the computer and sent to the database query module 1704. The database query module can be comprised of code interpretable by the processor or special purpose hardware.

The database query module 1704 formulates a string query 1704A which is used to query a string database 1706 to produce a set of retrieved strings 1704B. The string query can in some cases include location information. In some cases, the retrieved strings can also include bigram information. The string database can be a relational or other form of database that is capable of storing strings in memory and retrieving strings in response to a query.

The bigram module 1708 retrieves the incomplete input string 1702 and the retrieved strings 1704B. The bigram module extracts bigrams 1708A from the incomplete input string, and in the case where bigrams are not stored in the string database 1706, also extracts bigrams from the retrieved strings 1704B. Using the extracted bigrams, the bigram module determines the bigram matching coefficients 1708B, and filters some retrieved strings 1704B which do not possess bigram coefficients exceeding a predetermined threshold value. These filtered strings 1708C are passed to the similarity metrics module 1710.

The similarity metric module 1710 receives the incomplete input string and the filtered strings and constructs a plurality of similarity metrics 1710C, including one or more distance metrics 1710A and one or more phonetic metrics 1710B. These similarity metrics are sent to the machine learning module 1712.

The machine learning module 1710 can use the similarity metrics 1710C as an input to a machine learning model 1712A. This model can be an ensemble machine learning classifier composed of a SVM, a random forest, and a logistic regression machine learning model. The machine learning model produces a plurality of similarity scores 1712B, which can then be sent to the comparison module 1714.

The comparison module 1714 receives the similarity scores and their corresponding strings from the database. It can then sort those scores 1714A, and the strings corresponding to those scores 1714B. The string corresponding to the greatest score can be output as a corresponding string based on an incomplete input string, in this way completing the method according to embodiments of the invention.

C. Results

The method, according to embodiments was tested against other potential methods for matching an incomplete string to a corresponding string stored in memory. Using a system which made use of location and bigram matching, along with three sub machine learning models, SVM, random forest, and logistic regression, a corresponding string stored in memory was correctly identified on average 96.12% of the time.

The training data consisted of 10000 labelled incorrect input strings of 20 characters or less. Each string corresponded to the name of a merchant. Some strings were manually generated and labelled, and others were automatically pulled from a database of real credit card transactions. The experiment data set consisted of approximately 1000 unlabeled incorrect input strings of 20 characters or less. These strings were randomly pulled from the same database of real credit card transactions, and were each matched to an intended or correct string.

The experiment was conducted by passing the approximately 1000 experiment strings into the string matching system. The system would output the matching string it identified for each experimental string. For 96.12% of the experimental strings, the output from the string matching system was identical to the intended or correct string.

These same approximately 1000 experiment strings were passed into conventional systems that attempted to match strings based on single distance or phonetic metrics. A complete match system achieved an accuracy of 45.00%. An NYSIIS matching system achieved an accuracy of 78.65%. A method which minimized the Levenshtein distance achieved accuracy of 59.28%. As is evident, the accuracy achieved by the system was far greater than the accuracy of the other potential methods tested. Table 3 below summarizes these results:

TABLE 3

Accuracy results of different techniques

| Method | Present Techniques | Complete Match | NYSIIS Match | Levenshtein Minimization |
|---|---|---|---|---|
| Accuracy | 96.12% | 45.00% | 78.65% | 59.28% |

VI. Computer System

Figure 18:
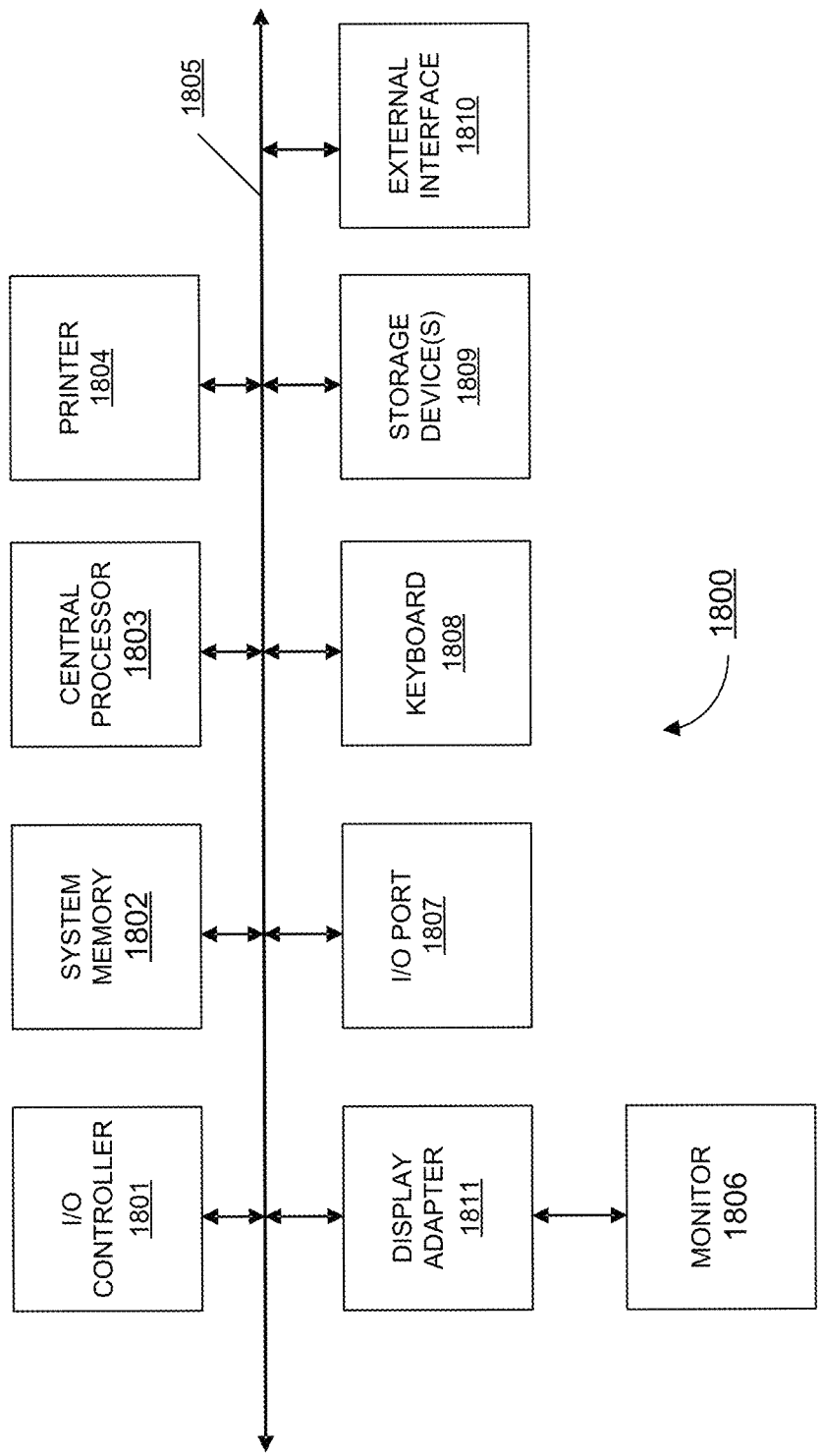
FIG. 18 is a block diagram of a computer system and associated peripherals capable of performing the method according to embodiments of the invention.

Any of the computer systems mentioned herein may utilize any suitable number of subsystems. Examples of such subsystems are shown in FIG. 18 in computer apparatus 1800. In some embodiments, a computer system includes a single computer apparatus, where the subsystems can be components of the computer apparatus. In other embodiments, a computer system can include multiple computer apparatuses, each being a subsystem, with internal components.

The subsystems shown in FIG. 18 are interconnected via a system bus 1805. Additional subsystems such as a printer 1804, keyboard 1808, storage device(s) 1809, monitor 1806, which is coupled to display adapter 1811, and others are shown. Peripherals and input/output (I/O) devices which couple to I/O controller 1801, can be connected to the computer system by any number of means known in the art such as input/output (I/O) port 1807 (e.g., USB, FireWire®). For example, I/O port 1807 or external interface 1810 (e.g. Ethernet, Wi-Fi, etc.) can be used to connect computer system 1800 to a wide area network such as the Internet, a mouse input device, or a scanner. The interconnection via system bus 1805 allows the central processor 1803 to communicate with each subsystem and to control the execution of instructions from system memory 1802 or the storage device(s) 1809 (e.g., a fixed disk, such as a hard drive or optical disk), as well as the exchange of information between subsystems. The system memory 1802 and/or the storage device(s) 1809 may embody a computer readable medium. Any of the data mentioned herein can be output from one component to another component and can be output to the user.

A computer system can include a plurality of the same components or subsystems, e.g., connected together by external interface 1810 or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising performing, by a computer system:
    retrieving, in response to receiving a search query including an incomplete input string, a plurality of stored strings from a database;
    performing a first filtering comprising, for each stored string of the plurality of stored strings:
        comparing the incomplete input string to the stored string to determine a plurality of similarity metrics that measure a difference between the incomplete input string and the stored string, the plurality of similarity metrics including at least one distance metric measuring a first difference between characters in the incomplete input string and the stored string and at least one phonetic metric measuring a second difference in phonemes between the incomplete input string and the stored string; and
        providing the plurality of similarity metrics as input features to a machine learning model to obtain a similarity score including a probability that the stored string matches the incomplete input string; and
    returning a first stored string as a response to the search query, the first stored string corresponding to a highest similarity score of a plurality of similarity scores obtained during the first filtering.

2. The method of claim 1, wherein the search query further comprises location information that identifies a geographical region corresponding to the incomplete input string, the method further comprising selecting the plurality of stored strings based at least in part on the location information.

3. The method of claim 1, wherein the search query further comprises database information that identifies a particular database corresponding to the incomplete input string, the method further comprising selecting the plurality of stored strings from the particular database.

4. The method of claim 1, further comprising performing a second filtering comprising comparing one or more bigrams of the incomplete input string to one or more bigrams of the plurality of stored strings.

5. The method of claim 1, wherein the response to the search query includes one or more stored strings of plurality of stored strings, each of the one or more stored strings corresponding to a respective similarity score above a similarity threshold.

6. The method of claim 1, further comprising retrieving the stored strings from the database by performing a second filtering, the second filtering comprising:
    for each potential string of a plurality of potential strings stored in the database:
        determining a first set of bigrams associated with the incomplete input string and a second set of bigrams associated with a potential string; and
        selecting the potential string when at least one bigram of the first set of bigrams matches at least one bigram of the second set of bigrams.

7. The method of claim 1, wherein the machine learning model is an ensemble machine learning classifier composed of a support vector machine learning model, a random forest machine learning model, and a logistic regression machine learning module, wherein the support vector machine learning model produces a first similarity score, the random forest machine learning model produces a second similarity score, and the logistic regression machine learning model producing a third similarity score, and wherein the first, the second, and the third similarity scores are averaged to produce the similarity score obtained by providing the plurality of similarity metrics as input features to the machine learning model.

8. The method of claim 1, wherein the at least one distance metric is selected from a group consisting of: Levenshtein Distance; Hamming Distance; Jaccard Distance; Jaro-Winkler Distance; Levenshtein Small Alignment; Levenshtein Long Alignment;
    and Affine Gap.

9. The method of claim 1, wherein the at least one phonetic metric is selected from a group consisting of: Metaphone; Double Metaphone; Soundex; NYSIIS; Match Rating Codex; and Caverphone.

10. The method of claim 1, wherein determining one of the at least one phonetic metric includes:
    applying a phonetic algorithm to the incomplete input string to obtain a first encoding;
    applying the phonetic algorithm to the stored string to obtain a second encoding; and comparing the first encoding to the second encoding to determine a classification of whether the encodings match, wherein the classification is used as the phonetic metric.

11. The method of claim 1, wherein the incomplete input string includes a first plurality of characters and the stored string includes a second plurality of characters, and wherein determining one of the at least one distance metric includes:
for each of the first plurality of characters of the incomplete input string:
comparing the character of the incomplete input string to a character of the stored string;
incrementing a counter based on whether the characters match; and
producing a distance metric based on a value of the counter.

12. A computer system comprising:
a processor; and
a computer readable medium, the computer readable medium containing code readable by the processor to implement a method performed by the computer system of identifying a corresponding string stored in memory based on an incomplete input string, the method comprising:
retrieving, in response to receiving a search query including the incomplete input string, a plurality of stored strings from a database;
performing a first filtering comprising, for each stored string of the plurality of stored strings:
comparing the incomplete input string to the stored string to determine a plurality of similarity metrics that measure a difference between the incomplete input string and the stored string, the plurality of similarity metrics including at least one distance metric measuring a first difference between characters in the incomplete input string and the stored string and at least one phonetic metric measuring a second difference in phonemes between the incomplete input string and the stored string; and
providing the plurality of similarity metrics as input features to a machine learning model to obtain a similarity score including a probability that the stored string matches the incomplete input string; and
returning a first stored string as a response to the search query, the first stored string corresponding to a highest similarity score of a plurality of similarity scores obtained during the first filtering.

13. The computer system of claim 12, wherein the search query further comprises location information that identifies a geographical region corresponding to the incomplete input string, the method further comprising selecting the plurality of stored strings based at least in part on the location information.

14. The computer system of claim 12, wherein the search query further comprises database information that identifies a particular database corresponding to the incomplete input string, the method further comprising selecting the plurality of stored strings from the particular database.

15. The computer system of claim 12, wherein the method performed by the processor further comprises performing a second filtering comprising comparing one or more bigrams of the incomplete input string to one or more bigrams of the plurality of stored strings.

16. The computer system of claim 12, wherein the response to the search query includes one or more stored strings of plurality of stored strings, each of the one or more stored strings corresponding to a respective similarity score above a similarity threshold.

17. The computer system of claim 12, wherein the method performed by the processor further comprises:
for each potential string of a plurality of potential strings stored in the database:
determining a first set of bigrams associated with the incomplete input string and a second set of bigrams associated with a potential string; and
selecting the potential string when at least one bigram of the first set of bigrams matches at least one bigram of the second set of bigrams.

18. The computer system of claim 12, wherein the machine learning model is an ensemble machine learning classifier composed of a support vector machine learning model, a random forest machine learning model, and a logistic regression machine learning module, wherein the support vector machine learning model produces a first similarity score, the random forest machine learning model produces a second similarity score, and the logistic regression machine learning model producing a third similarity score, and wherein the first, the second, and the third similarity scores are averaged to produce the similarity score obtained by providing the plurality of similarity metrics as input features to the machine learning model.

19. The computer system of claim 12, wherein determining one of the at least one phonetic metric includes:
applying a phonetic algorithm to the incomplete input string to obtain a first encoding;
applying the phonetic algorithm to the stored string to obtain a second encoding; and
comparing the first encoding to the second encoding to determine a classification of whether the encodings match, wherein the classification is used as the phonetic metric.

20. The computer system of claim 12, wherein the incomplete input string includes a first plurality of characters and the stored string includes a second plurality of characters, and wherein determining one of the at least one distance metric includes:
for each of the first plurality of characters of the incomplete input string:
comparing the character of the incomplete input string to a character of the stored string;
incrementing a counter based on whether the characters match; and
producing a distance metric based on a value of the counter.

* * * * *